(12) United States Patent
Fu et al.

(10) Patent No.: US 11,741,400 B1
(45) Date of Patent: Aug. 29, 2023

(54) MACHINE LEARNING-BASED REAL-TIME GUEST RIDER IDENTIFICATION

(71) Applicant: Beijing DiDi Infinity Technology and Development Co., Ltd., Beijing (CN)

(72) Inventors: Conghui Fu, Sunnyvale, CA (US); Zihan Yi, Mountain View, CA (US); Zetian Ni, Sunnyvale, CA (US); Xin Chen, Sunnyvale, CA (US)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 103 days.

(21) Appl. No.: 17/127,752

(22) Filed: Dec. 18, 2020

(51) Int. Cl.
| | |
|---|---|
| G06Q 10/02 | (2012.01) |
| G06Q 50/30 | (2012.01) |
| G10L 17/06 | (2013.01) |
| G06N 20/00 | (2019.01) |
| G06F 18/213 | (2023.01) |
| G06F 18/214 | (2023.01) |

(52) U.S. Cl.
CPC .......... *G06Q 10/02* (2013.01); *G06F 18/213* (2023.01); *G06F 18/214* (2023.01); *G06N 20/00* (2019.01); *G06Q 50/30* (2013.01); *G10L 17/06* (2013.01)

(58) Field of Classification Search
CPC ...... G06Q 10/02; G06Q 50/30; G06K 9/6232; G06K 9/6256; G06N 20/00; G10L 17/06
See application file for complete search history.

(56) References Cited

U.S. PATENT DOCUMENTS

| | | | |
|---|---|---|---|
| 10,264,389 B1 | 4/2019 | Hwang et al. | |
| 2010/0299177 A1 | 11/2010 | Buczkowski et al. | |
| 2011/0093258 A1* | 4/2011 | Xu | G06F 40/237 |
| | | | 704/9 |
| 2018/0233141 A1 | 8/2018 | Solomon et al. | |
| 2019/0163603 A1* | 5/2019 | Brown | H04L 41/069 |
| 2019/0373111 A1* | 12/2019 | Rute | G10L 15/02 |
| 2020/0120185 A1 | 4/2020 | Salter et al. | |
| 2020/0193836 A1* | 6/2020 | Narayan | G08G 1/052 |
| 2020/0247357 A1 | 8/2020 | Wengreen et al. | |
| 2020/0402019 A1* | 12/2020 | Truong | G06Q 10/1093 |
| 2022/0224963 A1 | 7/2022 | Herz et al. | |

FOREIGN PATENT DOCUMENTS

WO    WO-2022069375 A2 *  4/2022

* cited by examiner

*Primary Examiner* — Bhavesh M Mehta
*Assistant Examiner* — Philip H Lam
(74) *Attorney, Agent, or Firm* — Knobbe Martens Olson & Bear LLP

(57) ABSTRACT

Techniques for automatically detecting when a ride requester has requested a ride-share ride on behalf of a guest rider using some or all of the communications between the driver and ride requester are described herein. For example, a server can obtain chat logs between a ride requester and a driver and process the chat logs to identify whether the ride requester has requested a ride on behalf of a guest rider. In particular, the server can train an artificial intelligence model (e.g., a machine learning model) to predict potential guest rider behavior. Once trained, the server can obtain chat logs comprising chat messages sent between a driver and a ride requester, and apply a representation of the chat logs as an input to the trained artificial intelligence model to determine whether guest rider behavior is detected.

20 Claims, 8 Drawing Sheets

MACHINE LEARNING-BASED REAL-TIME GUEST RIDER IDENTIFICATION

INCORPORATION BY REFERENCE TO ANY PRIORITY APPLICATIONS

Any and all applications, if any, for which a foreign or domestic priority claim is identified in the Application Data Sheet of the present application are hereby incorporated by reference in their entireties under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Vehicles—such as vehicles used for ride-sharing purposes, vehicles that provide driver-assist functionality, and/or automated or autonomous vehicles (AVs)—may obtain and process sensor data using an on-board data processing system to perform a variety of functions. For example, functions can include determining and/or displaying navigational routes, identifying road signs, detecting objects and/or road obstructions, controlling vehicle operation, and/or the like.

In situations in which a vehicle is used for ride-sharing purposes, a network-based, ride-share platform can be established that allows a driver to communicate with a person that requests a ride from the driver (e.g., a ride requester). For example, a mobile application running on a driver's device and a mobile application running on the ride requester's device may serve as an interface that allows the two individuals to communicate via the network-based, ride-share platform. The driver and ride requester may communicate before a ride begins to coordinate a pickup location, to indicate an expected pickup time, and/or to identify any other issues or information that may be pertinent to the requested ride.

SUMMARY

One aspect of the disclosure provides a system comprising a data store comprising chat log data. The system further comprises a processor in communication with the data store, the processor configured with computer-executable instructions that, when executed, cause the processor to: obtain the chat log data, where the chat log data comprises a plurality of chat messages sent between a driver and a ride requester during a ride-share session; apply a first label to any chat message in the plurality of chat messages that satisfies a condition; filter the plurality of chat messages to exclude any chat message in the plurality of chat messages that was sent by the driver or that was sent after a passenger was picked up during the ride-share session; convert each chat message in the filtered plurality of chat messages into one or more vectors; apply the first label to a vector in the one or more vectors in response to a determination that the first label is applied to a chat message from which the respective vector is derived; and train, using the one or more vectors, an artificial intelligence model to predict behavior in which another ride requester has initiated another ride-share session on behalf of a third party.

The system of the preceding paragraph can include any sub-combination of the following features: where the computer-executable instructions, when executed, further cause the processor to convert each chat message in the filtered plurality of chat messages into the one or more vectors using a natural language processing algorithm; where the first label comprises a positive label; where the computer-executable instructions, when executed, further cause the processor to apply a negative label to any chat message in the plurality of chat messages that does not satisfy the condition; where the condition is satisfied if the respective chat message in the plurality of chat messages includes one or more keywords; where the data store further comprises location data, and where the location data comprises an indication of a geographic location of the driver and a geographic location of the ride requester when each chat message in the plurality of chat messages was sent; where the condition in response to a determination that the respective chat message in the plurality of chat messages was sent when a difference between a geographic location of the driver and a geographic location of the ride requester was at least a threshold distance; where the data store further comprises audio data, and where the audio data corresponds to one or more recorded telephone calls between the driver and the ride requester during the ride-share session; where the computer-executable instructions, when executed, further cause the processor to: obtain the audio data, perform speech recognition on the audio data to generate a transcript, apply the first label to any sentence in the transcript that satisfies the condition, filter the transcript to exclude any sentence uttered by the driver or that was uttered after the passenger was picked up during the ride-share session, convert each sentence in the filtered transcript into one or more second vectors, apply the first label to a vector in the one or more second vectors in response to a determination that the first label is applied to a sentence from which the respective vector is derived, and train, using the one or more vectors and the one or more second vectors, the artificial intelligence model; and where the artificial intelligence model comprises a machine learning model.

Another aspect of the disclosure provides a computer-implemented method comprising: as implemented by one or more computing devices that provide a ride-share platform, obtaining chat log data, where the chat log data comprises a plurality of chat messages sent between a driver and a ride requester during a ride-share session; applying a first label to any chat message in the plurality of chat messages that satisfies a condition; filtering the plurality of chat messages to exclude any chat message in the plurality of chat messages that was sent by the driver or that was sent after a passenger was picked up during the ride-share session; converting each chat message in the filtered plurality of chat messages into one or more vectors; applying the first label to a vector in the one or more vectors in response to a determination that the first label is applied to a chat message from which the respective vector is derived; and training, using the one or more vectors, an artificial intelligence model to predict behavior in which another ride requester has initiated another ride-share session on behalf of a third party.

The computer-implemented method of the preceding paragraph can include any sub-combination of the following features: where converting each chat message in the filtered plurality of chat messages into one or more vectors further comprises converting each chat message in the filtered plurality of chat messages into the one or more vectors using a natural language processing algorithm; where the first label comprises a positive label; where the computer-implemented method further comprises applying a negative label to any chat message in the plurality of chat messages that does not satisfy the condition; where the condition is satisfied if the respective chat message in the plurality of chat messages includes one or more keywords; and where the computer-implemented method further comprises: obtaining audio data, where the audio data corresponds to one or more recorded telephone calls between the driver and the ride requester during the ride-share session, performing speech recognition on the audio data to generate a transcript, applying the first label to any sentence in the transcript that satisfies the condition, filtering the transcript to exclude any sentence uttered by the driver or that was uttered after the passenger was picked up during the ride-share session, converting each sentence in the filtered transcript into one or more second vectors, applying the first label to a vector in the one or more second vectors in response to a determination that the first label is applied to a sentence from which the respective vector is derived, and training, using the one or more vectors and the one or more second vectors, the artificial intelligence model.

Another aspect of the disclosure provides non-transitory, computer-readable storage media comprising computer executable instructions for training an artificial intelligence model for predicting guest rider behavior, where the computer-executable instructions, when executed by a computing system, cause the computing system to: obtain chat log data, where the chat log data comprises a plurality of chat messages sent between a driver and a ride requester during a ride-share session; apply a first label to any chat message in the plurality of chat messages that satisfies a condition; filter the plurality of chat messages to exclude any chat message in the plurality of chat messages that was sent by the driver or that was sent after a passenger was picked up during the ride-share session; convert each chat message in the filtered plurality of chat messages into one or more vectors; apply the first label to a vector in the one or more vectors in response to a determination that the first label is applied to a chat message from which the respective vector is derived; and train, using the one or more vectors, the artificial intelligence model to predict behavior in which another ride requester has initiated another ride-share session on behalf of a third party.

The non-transitory, computer-readable storage media of the preceding paragraph can include any sub-combination of the following features: where the computer-executable instructions, when executed, further cause the computing system to convert each chat message in the filtered plurality of chat messages into the one or more vectors using a natural language processing algorithm; where the computer-executable instructions, when executed, further cause the computing system to apply a negative label to any chat message in the plurality of chat messages that does not satisfy the condition; and where the computer-executable instructions, when executed, further cause the computing system to: obtain audio data, where the audio data corresponds to one or more recorded telephone calls between the driver and the ride requester during the ride-share session, perform speech recognition on the audio data to generate a transcript, apply the first label to any sentence in the transcript that satisfies the condition, filter the transcript to exclude any sentence uttered by the driver or that was uttered after the passenger was picked up during the ride-share session, convert each sentence in the filtered transcript into one or more second vectors, apply the first label to a vector in the one or more second vectors in response to a determination that the first label is applied to a sentence from which the respective vector is derived, and train, using the one or more vectors and the one or more second vectors, the artificial intelligence model.

Another aspect of the disclosure provides a system comprising a data store comprising chat log data corresponding to a ride-share session. The system further comprises a processor in communication with the data store, the processor configured with computer-executable instructions that, when executed, cause the processor to: retrieve the chat log data corresponding to the ride-share session, where the chat log data comprises a plurality of chat messages sent between a driver and a ride requester during the ride-share session; filter the plurality of chat messages to exclude any chat message in the plurality of chat messages that was sent by the driver or that was sent after a passenger was picked up during the ride-share session; convert each chat message in the filtered plurality of chat messages into one or more vectors; apply the one or more vectors as an input to an artificial intelligence model trained to predict whether the ride requester has initiated the ride-share session on behalf of a third party; and cause a guest rider action to occur in response to a determination that the artificial intelligence model outputs a value that exceeds a threshold value.

The system of the preceding paragraph can include any sub-combination of the following features: where the computer-executable instructions, when executed, further cause the processor to retrieve the chat log data in response to a determination that a chat message associated with the ride-share session has been received; where the computer-executable instructions, when executed, further cause the processor to: determine whether a passenger has been picked up by the driver during the ride-share session in response to a determination that the value does not exceed the threshold value, and use the artificial intelligence model to predict whether the ride requester has initiated the ride-share session on behalf of the third party based on the one or more vectors and one or more second vectors derived from a new chat message received after the artificial intelligence model outputs the value in response to a determination that the passenger has not been picked up; where the computer-executable instructions, when executed, further cause the processor to continue using the artificial intelligence model to determine whether the ride requester has initiated the ride-share session on behalf of the third party until either the artificial intelligence model outputs a second value that exceeds the threshold value or an indication is received that the passenger was picked up; where the guest rider action comprises one of assignment or re-assignment of another driver to the ride-share session, alteration of a ride route for the ride-share session, or initiation of a fraud detection protocol; where the computer-executable instructions, when executed, further cause the processor to convert each chat message in the filtered plurality of chat messages into the one or more vectors using a natural language processing algorithm; where the data store further comprises audio data, and where the audio data corresponds to one or more recorded telephone calls between the driver and the ride requester during the ride-share session; where the computer-executable instructions, when executed, further cause the processor to: obtain the audio data, perform speech recognition on the audio data to generate a transcript, filter the transcript to exclude any sentence uttered by the driver or that was uttered after the passenger was picked up during the ride-share session, convert each sentence in the filtered transcript into one or more second vectors, and apply the one or more vectors and the one or more second vectors as an input to the artificial intelligence model trained to predict whether the ride requester has initiated the ride-share session on behalf of the third party; where the artificial intelligence model comprises a machine learning model; and where the artificial intelligence model is associated with a same criterion as the ride-share session.

Another aspect of the disclosure provides a computer-implemented method comprising: as implemented by one or more computing devices in communication, over a network, with a user device operated by a driver and a user device operated by a ride requester, retrieving chat log data corresponding to a ride-share session, where the chat log data comprises a plurality of chat messages sent between the user device operated by the driver and the user device operated by the ride requester during the ride-share session; filtering the plurality of chat messages to exclude any chat message in the plurality of chat messages that was sent by the driver or that was sent after a passenger was picked up during the ride-share session; converting each chat message in the filtered plurality of chat messages into one or more vectors; applying the one or more vectors as an input to an artificial intelligence model trained to predict whether the ride requester has initiated the ride-share session on behalf of a third party; and causing a guest rider action to occur in response to a determination that the artificial intelligence model outputs a value that exceeds a threshold value.

The computer-implemented method of the preceding paragraph can include any sub-combination of the following features: where retrieving chat log data further comprises retrieving the chat log data in response to a determination that a chat message associated with the ride-share session has been received; where the computer-implemented method further comprises: determining whether a passenger has been picked up by the driver during the ride-share session in response to a determination that the value does not exceed the threshold value, and using the artificial intelligence model to predict whether the ride requester has initiated the ride-share session on behalf of the third party based on the one or more vectors and one or more second vectors derived from a new chat message received after the artificial intelligence model outputs the value in response to a determination that the passenger has not been picked up; where the computer-implemented method further comprises continuing to use the artificial intelligence model to determine whether the ride requester has initiated the ride-share session on behalf of the third party until either the artificial intelligence model outputs a second value that exceeds the threshold value or an indication is received that the passenger was picked up; where the guest rider action comprises one of assignment or re-assignment of another driver to the ride-share session, alteration of a ride route for the ride-share session, or initiation of a fraud detection protocol; and where the computer-implemented method further comprises: obtaining audio data, where the audio data corresponds to one or more recorded telephone calls between the driver and the ride requester during the ride-share session, performing speech recognition on the audio data to generate a transcript, filtering the transcript to exclude any sentence uttered by the driver or that was uttered after the passenger was picked up during the ride-share session, converting each sentence in the filtered transcript into one or more second vectors, and applying the one or more vectors and the one or more second vectors as an input to the artificial intelligence model trained to predict whether the ride requester has initiated the ride-share session on behalf of the third party.

Another aspect of the disclosure provides non-transitory, computer-readable storage media comprising computer executable instructions for predicting guest rider behavior, where the computer-executable instructions, when executed by a computing system, cause the computing system to: retrieve chat log data corresponding to the ride-share session, where the chat log data comprises a plurality of chat messages sent between a driver and a ride requester during a ride-share session; filter the plurality of chat messages to exclude any chat message in the plurality of chat messages that was sent by the driver or that was sent after a passenger was picked up during the ride-share session; convert each chat message in the filtered plurality of chat messages into one or more vectors; apply the one or more vectors as an input to an artificial intelligence model trained to predict whether the ride requester has initiated the ride-share session on behalf of a third party; and cause a guest rider action to occur in response to a determination that the artificial intelligence model outputs a value that exceeds a threshold value.

The non-transitory, computer-readable storage media of the preceding paragraph can include any sub-combination of the following features: where the computer-executable instructions, when executed, further cause the computing system to: determine whether a passenger has been picked up by the driver during the ride-share session in response to a determination that the value does not exceed the threshold value, and use the artificial intelligence model to predict whether the ride requester has initiated the ride-share session on behalf of the third party based on the one or more vectors and one or more second vectors derived from a new chat message received after the artificial intelligence model outputs the value in response to a determination that the passenger has not been picked up; where the computer-executable instructions, when executed, further cause the computing system to continue using the artificial intelligence model to determine whether the ride requester has initiated the ride-share session on behalf of the third party until either the artificial intelligence model outputs a second value that exceeds the threshold value or an indication is received that the passenger was picked up; and where the computer-executable instructions, when executed, further cause the computing system to: obtain audio data, where the audio data corresponds to one or more recorded telephone calls between the driver and the ride requester during the ride-share session, perform speech recognition on the audio data to generate a transcript, filter the transcript to exclude any sentence uttered by the driver or that was uttered after the passenger was picked up during the ride-share session, convert each sentence in the filtered transcript into one or more second vectors, and apply the one or more vectors and the one or more second vectors as an input to the artificial intelligence model trained to predict whether the ride requester has initiated the ride-share session on behalf of the third party.

DETAILED DESCRIPTION

Figure 1A:
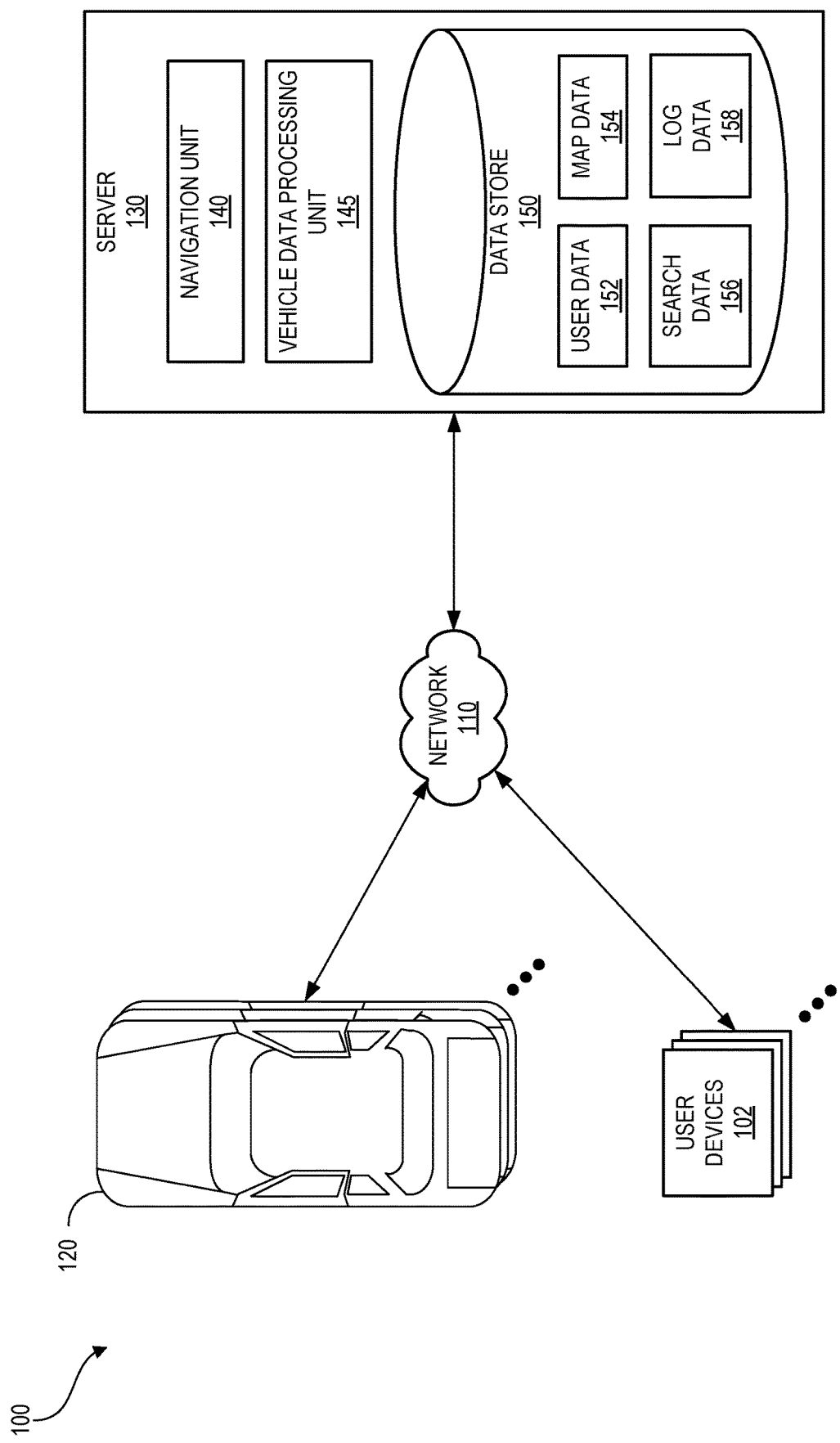
FIG. 1A illustrates a block diagram of a networked vehicle environment in which one or more vehicles and/or one or more user devices interact with a server via a network, according to certain aspects of the present disclosure.

As described above, a network-based platform may allow a driver and a ride requester to communicate via mobile applications running on their respective devices. In some cases, the driver and ride requester may communicate before a ride begins to coordinate a pickup location, to indicate an expected pickup time, and/or to identify any other issues or information that may be pertinent to the requested ride. Other issues or information that may be pertinent may include situations in which a ride requester is requesting a ride-share ride on behalf of a third party (e.g., the third party may be a passenger of the requested ride rather than the ride requester). For example, a ride requester may be using his or her ride-share account to request a ride on behalf of a spouse, a parent, a child, another minor, and/or the like. The person(s) on whose behalf a ride requester requests a ride may be referred to herein as a "guest rider" or a "proxy rider."

In such situations, safety may be a concern. For example, the ride requester may be worried that the guest rider may be more at risk of being mistreated by the driver, another passenger (e.g., if the ride-share requested is a carpool ride in which other, unrelated passenger(s) are picked up along a designated route), or some other third party given that the guest rider may not have access to the account that was used to request the ride (and therefore may be unknown to security officials of the entity that operates the ride-share platform, to law enforcement individuals, etc.) and/or may otherwise be unfamiliar with ride-share platform. Similarly, the driver may be worried of the risk of being mistreated by the guest rider given that the guest rider may be unknown to security officials of the entity that operates the ride-share platform, to law enforcement individuals, etc.

Often, a ride requester may not explicitly tell the ride-share platform that the ride requester is requesting a ride on behalf of a guest rider (e.g., the ride requester may not explicitly identify the ride as being for a guest rider when initially requesting the ride and before a driver is assigned to the request). However, after a driver is assigned to the request, the ride requester may inform the driver that the ride is for a guest rider because it may be helpful in coordinating a pickup time and/or location and/or allowing the driver to identify the appropriate person to be picked up. For example, the ride requester may use a chat feature provided by the mobile application to send one or more chat messages to the driver to indicate that the ride is for a guest rider. As another example, the ride requester may call the driver via the mobile application to inform the driver that the ride is for a guest rider.

Accordingly, described herein are techniques for automatically detecting when a ride requester has requested a ride-share ride on behalf of a guest rider using some or all of the communications between the driver and ride requester. For example, a server can obtain chat logs between a ride requester and a driver and process the chat logs to identify whether the ride requester has requested a ride on behalf of a guest rider. In particular, the server can train an artificial intelligence model (e.g., a machine learning model) to predict potential guest rider behavior (e.g., to predict whether obtained chat logs indicate that a ride requester may have requested a ride on behalf of a guest rider). Once trained, the server can obtain chat logs comprising chat messages sent between a driver and a ride requester, and apply a representation of the chat logs as an input to the trained artificial intelligence model to determine whether guest rider behavior is detected. If guest rider behavior is not detected by the trained artificial intelligence model, then the server may continue to obtain chat logs corresponding to chat messages sent between the driver and the ride requester and apply a representation of the chat logs as an input to the trained artificial intelligence model until the trained artificial intelligence model outputs a prediction that guest rider behavior is detected, a requested ride begins, a threshold time period has passed, and/or another condition is satisfied. If guest rider behavior is detected, the server may initiate one or more guest rider actions, such as assigning or re-assigning another driver to the requested ride (e.g., a female driver, a male driver, a driver with a higher rating, a driver that has passed an enhanced background check, etc.); altering the ride route to travel along busier streets or highways, well-lighted streets or highways, closer to law enforcement postings or locations, and/or the like; initiating fraud detection protocols (e.g., contacting a holder of the account that requested the ride to ensure that the account was not hacked or otherwise accessed without authorization by the account holder); and/or the like.

While the server can process a large majority of or all of the chat logs corresponding to communications between drivers and ride requesters over a period of time, within a certain location, for a certain number of requested rides, and/or any combination thereof in order to train the artificial intelligence model, this may be inefficient. For example, a driver and ride requester may send numerous chat messages to each other before the ride begins, during the ride (e.g., to communicate if the driver and ride requester speak different languages, to inform the ride requester that the passenger has been picked up, etc.), and/or after the ride ends (e.g., if the passenger left an item in the vehicle, to inform a ride requester that the ride has completed, etc.). A large majority of these chat messages, however, may not indicate that a ride has been requested for a guest rider. As an illustrative example, the driver and ride requester may send 100 chat messages to each other before the ride begins, during the ride, and/or after the ride ends. Only 1 or 2 of these chat messages, however, may actually indicate that the ride is being requested on behalf of a guest rider. In many cases, a ride requester is requesting a ride for himself or herself—not a guest rider—and therefore none of the chat messages may indicate that a ride is being requested on behalf of a guest rider. Thus, the corpus of chat messages that can be obtained and potentially used to train the artificial intelligence model may actually be very noisy (e.g., very few of the chat messages may actually indicate guest rider behavior, which the model is being trained to predict or detect). If the server used a large majority of or all of the chat messages between drivers and ride requesters obtained over a period of time, within a certain location, for a certain number of requested rides, and/or any combination thereof as training data to train the artificial intelligence model, then the trained artificial intelligence model may be less accurate given the noisy training data and the low number of chat messages that may be positively labeled as indicating potential guest rider behavior.

Another technical issue that may arise involves accurately labeling the training data. As referenced above, very few of the total number of chat messages that can be included in the training data may actually be positively labeled as indicating potential guest rider behavior. In fact, it may be difficult to accurately label chat messages in the first place. Generally, a ride requester may not explicitly state in a single chat message that the ride is being requested for a third party. Often, guest rider behavior may be indicated by a sequence of chat messages sent by the ride requester, a question sent by a driver and an answer sent by the rider requester, and/or the like. The server analyzing chat messages one by one therefore may be insufficient to properly identify one or more chat messages that should be positively labeled.

Accordingly, the server described herein can improve the accuracy of the trained artificial intelligence model by preprocessing chat logs prior to training the artificial intelligence model. In particular, the server can filter the chat messages that are included in the training data and/or use keyword matching and/or location data to automatically apply positive labels to certain chat messages included in the training data. For example, the server can obtain chat logs comprising chat messages between drivers and ride requesters over a period of time, within a certain location, for a certain number of requested rides, and/or any combination thereof; filter the chat logs to include those chat logs that are more likely to include chat messages in which guest rider behavior is indicated (e.g., chat logs sent by the ride requester, chat messages sent by the ride requester before the ride begins (e.g., before a passenger is picked up), etc.); and include the filtered chat logs in the training data. In addition, the server can parse the chat logs included in the training data (and/or some or all of the chat logs regardless of whether the chat logs are included in the training data) and apply a positive label to a chat message included in the chat logs if the chat message include at least one word that matches at least one word in a set of predetermined keywords and/or if the chat message was sent at a time in which a physical distance between the ride requester and the driver is greater than a threshold distance (e.g., 100 m, 1 km, 2 km, 1000 ft, 0.5 miles, 1 mile, etc.). By preprocessing the chat logs in the manner described herein, the server can reduce the size of the training data while increasing the percentage of the training data that is positively labeled, thereby resulting in a more accurate trained artificial intelligence model.

Detailed descriptions and examples of systems and methods according to one or more illustrative embodiments of the present disclosure may be found, at least, in the section entitled Machine Learning-Based Guest Rider Identification, as well as in the section entitled Example Embodiments, and also in FIGS. 2 through 7 herein. Furthermore, components and functionality for identifying when a rideshare ride is requested for a guest rider may be configured and/or incorporated into the networked vehicle environment 100 described herein in FIGS. 1A-1B.

Various embodiments described herein are intimately tied to, enabled by, and would not exist except for, vehicle and/or computer technology. For example, the identification, using machine learning, of a situation in which a ride-share ride is requested for a guest rider described herein in reference to various embodiments cannot reasonably be performed by humans alone, without the vehicle and/or computer technology upon which they are implemented.

Networked Vehicle Environment

FIG. 1A illustrates a block diagram of a networked vehicle environment 100 in which one or more vehicles 120 and/or one or more user devices 102 interact with a server 130 via a network 110, according to certain aspects of the present disclosure. For example, the vehicles 120 may be equipped to provide ride-sharing and/or other location-based services, to assist drivers in controlling vehicle operation (e.g., via various driver-assist features, such as adaptive and/or regular cruise control, adaptive headlight control, anti-lock braking, automatic parking, night vision, blind spot monitor, collision avoidance, crosswind stabilization, driver drowsiness detection, driver monitoring system, emergency driver assistant, intersection assistant, hill descent control, intelligent speed adaptation, lane centering, lane departure warning, forward, rear, and/or side parking sensors, pedestrian detection, rain sensor, surround view system, tire pressure monitor, traffic sign recognition, turning assistant, wrong-way driving warning, traffic condition alerts, etc.), and/or to fully control vehicle operation. Thus, the vehicles 120 can be regular gasoline, natural gas, biofuel, electric, hydrogen, etc. vehicles configured to offer ride-sharing and/or other location-based services, vehicles that provide driver-assist functionality (e.g., one or more of the driver-assist features described herein), and/or automated or autonomous vehicles (AVs). The vehicles 120 can be automobiles, trucks, vans, buses, motorcycles, scooters, bicycles, and/or any other motorized vehicle.

The server 130 can communicate with the vehicles 120 to obtain vehicle data, such as route data, sensor data, perception data, vehicle 120 control data, vehicle 120 component fault and/or failure data, etc. The server 130 can process and store the vehicle data for use in other operations performed by the server 130 and/or another computing system (not shown). Such operations can include running diagnostic models to identify vehicle 120 operational issues (e.g., the cause of vehicle 120 navigational errors, unusual sensor readings, an object not being identified, vehicle 120 component failure, etc.); running models to simulate vehicle 120 performance given a set of variables; identifying objects that cannot be identified by a vehicle 120, generating control instructions that, when executed by a vehicle 120, cause the vehicle 120 to drive and/or maneuver in a certain manner along a specified path; and/or the like.

The server 130 can also transmit data to the vehicles 120. For example, the server 130 can transmit map data, firmware and/or software updates, vehicle 120 control instructions, an identification of an object that could not otherwise be identified by a vehicle 120, passenger pickup information, traffic data, and/or the like.

In addition to communicating with one or more vehicles 120, the server 130 can communicate with one or more user devices 102. In particular, the server 130 can provide a network service to enable a user to request, via an application running on a user device 102, location-based services (e.g., transportation services, such as ride-sharing services). For example, the user devices 102 can correspond to a computing device, such as a smart phone, tablet, laptop, smart watch, or any other device that can communicate over the network 110 with the server 130. A user device 102 can execute an application, such as a mobile application, that the user operating the user device 102 can use to interact with the server 130. For example, the user device 102 can communicate with the server 130 to provide location data and/or queries to the server 130, to receive map-related data and/or directions from the server 130, and/or the like.

The server 130 can process requests and/or other data received from user devices 102 to identify service providers (e.g., vehicle 120 drivers) to provide the requested services for the users. In addition, the server 130 can receive data—such as user trip pickup or destination data, user location query data, etc.—based on which the server 130 identifies a region, an address, and/or other location associated with the various users. The server 130 can then use the identified location to provide services providers and/or users with directions to a determined pickup location.

The application running on the user device 102 may be created and/or made available by the same entity responsible for the server 130. Alternatively, the application running on the user device 102 can be a third-party application that includes features (e.g., an application programming interface or software development kit) that enables communications with the server 130.

A single server 130 is illustrated in FIG. 1A for simplicity and ease of explanation. It is appreciated, however, that the server 130 may be a single computing device, or may include multiple distinct computing devices logically or physically grouped together to collectively operate as a server system. The components of the server 130 can be implemented in application-specific hardware (e.g., a server computing device with one or more ASICs) such that no software is necessary, or as a combination of hardware and software. In addition, the modules and components of the server 130 can be combined on one server computing device or separated individually or into groups on several server computing devices. The server 130 may include additional or fewer components than illustrated in FIG. 1A.

The network 110 includes any wired network, wireless network, or combination thereof. For example, the network 110 may be a personal area network, local area network, wide area network, over-the-air broadcast network (e.g., for radio or television), cable network, satellite network, cellular telephone network, or combination thereof. As a further example, the network 110 may be a publicly accessible network of linked networks, possibly operated by various distinct parties, such as the Internet. The network 110 may be a private or semi-private network, such as a corporate or university intranet. The network 110 may include one or more wireless networks, such as a Global System for Mobile Communications (GSM) network, a Code Division Multiple Access (CDMA) network, a Long Term Evolution (LTE) network, or any other type of wireless network. The network 110 can use protocols and components for communicating via the Internet or any of the other aforementioned types of networks. For example, the protocols used by the network 110 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The server 130 can include a navigation unit 140, a vehicle data processing unit 145, and a data store 150. The navigation unit 140 can assist with location-based services. For example, the navigation unit 140 can facilitate the transportation of a user (also referred to herein as a "rider") and/or an object (e.g., food, packages, etc.) by another user (also referred to herein as a "driver") from a first location (also referred to herein as a "pickup location") to a second location (also referred to herein as a "destination location"). The navigation unit 140 may facilitate user and/or object transportation by providing map and/or navigation instructions to an application running on a user device 102 of a rider, to an application running on a user device 102 of a driver, and/or to a navigational system running on a vehicle 120.

As an example, the navigation unit 140 can include a matching service (not shown) that pairs a rider requesting a trip from a pickup location to a destination location with a driver that can complete the trip. The matching service may interact with an application running on the user device 102 of the rider and/or an application running on the user device 102 of the driver to establish the trip for the rider and/or to process payment from the rider to the driver.

The navigation unit 140 can also communicate with the application running on the user device 102 of the driver during the trip to obtain trip location information from the user device 102 (e.g., via a global position system (GPS) component coupled to and/or embedded within the user device 102) and provide navigation directions to the application that aid the driver in traveling from the current location of the driver to the destination location. The navigation unit 140 can also direct the driver to various geographic locations or points of interest, regardless of whether the driver is carrying a rider.

The vehicle data processing unit 145 can be configured to support vehicle 120 driver-assist features and/or to support autonomous driving. For example, the vehicle data processing unit 145 can generate and/or transmit to a vehicle 120 map data, run diagnostic models to identify vehicle 120 operational issues, run models to simulate vehicle 120 performance given a set of variables, use vehicle data provided by a vehicle 120 to identify an object and transmit an identification of the object to the vehicle 120, generate and/or transmit to a vehicle 120 vehicle 120 control instructions, and/or the like.

The data store 150 can store various types of data used by the navigation unit 140, the vehicle data processing unit 145, the user devices 102, and/or the vehicles 120. For example, the data store 150 can store user data 152, map data 154, search data 156, and log data 158.

The user data 152 may include information on some or all of the users registered with a location-based service, such as drivers and riders. The information may include, for example, usernames, passwords, names, addresses, billing information, data associated with prior trips taken or serviced by a user, user rating information, user loyalty program information, and/or the like.

The map data 154 may include high definition (HD) maps generated from sensors (e.g., light detection and ranging (LiDAR) sensors, radio detection and ranging (RADAR) sensors, infrared cameras, visible light cameras, stereo cameras, an inertial measurement unit (IMU), etc.), satellite imagery, optical character recognition (OCR) performed on captured street images (e.g., to identify names of streets, to identify street sign text, to identify names of points of interest, etc.), etc.; information used to calculate routes; information used to render 2D and/or 3D graphical maps; and/or the like. For example, the map data 154 can include elements like the layout of streets and intersections, bridges (e.g., including information on the height and/or width of bridges over streets), off-ramps, buildings, parking structure entrances and exits (e.g., including information on the height and/or width of the vehicle entrances and/or exits), the placement of street signs and stop lights, emergency turn-offs, points of interest (e.g., parks, restaurants, fuel stations, attractions, landmarks, etc., and associated names), road markings (e.g., centerline markings dividing lanes of opposing traffic, lane markings, stop lines, left turn guide lines, right turn guide lines, crosswalks, bus lane markings, bike lane markings, island marking, pavement text, highway exist and entrance markings, etc.), curbs, rail lines, waterways, turning radiuses and/or angles of left and right turns, the distance and dimensions of road features, the placement of barriers between two-way traffic, and/or the like, along with the elements' associated geographical locations (e.g., geographical coordinates). The map data 154 can also include reference data, such as real-time and/or historical traffic information, current and/or predicted weather conditions, road work information, information regarding laws and regulations (e.g., speed limits, whether right turns on red lights are permitted or prohibited, whether U-turns are permitted or prohibited, permitted direction of travel, and/or the like), news events, and/or the like.

While the map data 154 is illustrated as being stored in the data store 150 of the server 130, this is not meant to be limiting. For example, the server 130 can transmit the map data 154 to a vehicle 120 for storage therein (e.g., in the data store 129, described below).

The search data 156 can include searches entered by various users in the past. For example, the search data 156 can include textual searches for pickup and/or destination locations. The searches can be for specific addresses, geographical locations, names associated with a geographical location (e.g., name of a park, restaurant, fuel station, attraction, landmark, etc.), etc.

The log data 158 can include vehicle data provided by one or more vehicles 120. For example, the vehicle data can include route data, sensor data, perception data, vehicle 120 control data, vehicle 120 component fault and/or failure data, etc.

Figure 1B:
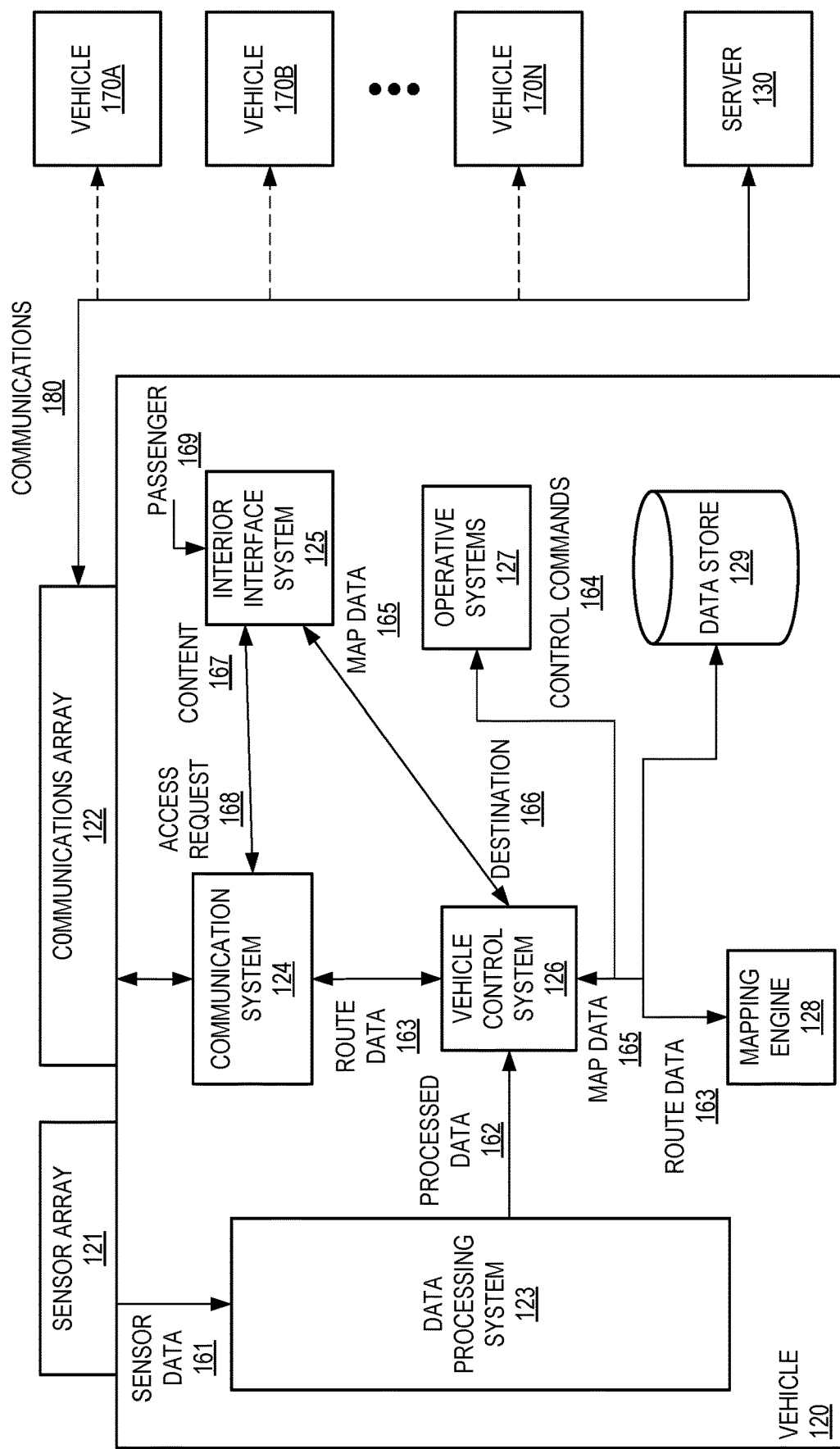
FIG. 1B illustrates a block diagram showing the vehicle of FIG. 1A in communication with one or more other vehicles and/or the server of FIG. 1A, according to certain aspects of the present disclosure.

FIG. 1B illustrates a block diagram showing the vehicle 120 of FIG. 1A in communication with one or more other vehicles 170A-N and/or the server 130 of FIG. 1A, according to certain aspects of the present disclosure. As illustrated in FIG. 1B, the vehicle 120 can include various components and/or data stores. For example, the vehicle 120 can include a sensor array 121, a communications array 122, a data processing system 123, a communication system 124, an interior interface system 125, a vehicle control system 126, operative systems 127, a mapping engine 128, and/or a data store 129.

Communications 180 may be transmitted and/or received between the vehicle 120, one or more vehicles 170A-N, and/or the server 130. The server 130 can transmit and/or receive data from the vehicle 120 as described above with respect to FIG. 1A. For example, the server 130 can transmit vehicle control instructions or commands (e.g., as communications 180) to the vehicle 120. The vehicle control instructions can be received by the communications array 122 (e.g., an array of one or more antennas configured to transmit and/or receive wireless signals), which is operated by the communication system 124 (e.g., a transceiver). The communication system 124 can transmit the vehicle control instructions to the vehicle control system 126, which can operate the acceleration, steering, braking, lights, signals, and other operative systems 127 of the vehicle 120 in order to drive and/or maneuver the vehicle 120 and/or assist a driver in driving and/or maneuvering the vehicle 120 through road traffic to destination locations specified by the vehicle control instructions.

As an example, the vehicle control instructions can include route data 163, which can be processed by the vehicle control system 126 to maneuver the vehicle 120 and/or assist a driver in maneuvering the vehicle 120 along a given route (e.g., an optimized route calculated by the server 130 and/or the mapping engine 128) to the specified destination location. In processing the route data 163, the vehicle control system 126 can generate control commands 164 for execution by the operative systems 127 (e.g., acceleration, steering, braking, maneuvering, reversing, etc.) to cause the vehicle 120 to travel along the route to the destination location and/or to assist a driver in maneuvering the vehicle 120 along the route to the destination location.

A destination location 166 may be specified by the server 130 based on user requests (e.g., pickup requests, delivery requests, etc.) transmitted from applications running on user devices 102. Alternatively or in addition, a passenger and/or driver of the vehicle 120 can provide user input(s) 169 through an interior interface system 125 (e.g., a vehicle navigation system) to provide a destination location 166. The vehicle control system 126 can transmit the inputted destination location 166 and/or a current location of the vehicle 120 (e.g., as a GPS data packet) as a communication 180 to the server 130 via the communication system 124 and the communications array 122. The server 130 (e.g., the navigation unit 140) can use the current location of the vehicle 120 and/or the inputted destination location 166 to perform an optimization operation to determine an optimal route for the vehicle 120 to travel to the destination location 166. Route data 163 that includes the optimal route can be transmitted from the server 130 to the vehicle control system 126 via the communications array 122 and the communication system 124. As a result of receiving the route data 163, the vehicle control system 126 can cause the operative systems 127 to maneuver the vehicle 120 through traffic to the destination location 166 along the optimal route, assist a driver in maneuvering the vehicle 120 through traffic to the destination location 166 along the optimal route, and/or cause the interior interface system 125 to display and/or present instructions for maneuvering the vehicle 120 through traffic to the destination location 166 along the optimal route.

Alternatively or in addition, the route data 163 includes the optimal route and the vehicle control system 126 automatically inputs the route data 163 into the mapping engine 128. The mapping engine 128 can generate map data 165 using the optimal route (e.g., generate a map showing the optimal route and/or instructions for taking the optimal route) and provide the map data 165 to the interior interface system 125 (e.g., via the vehicle control system 126) for display. The map data 165 may include information derived from the map data 154 stored in the data store 150 on the server 130. The displayed map data 165 can indicate an estimated time of arrival and/or show the progress of the vehicle 120 along the optimal route. The displayed map data 165 can also include indicators, such as reroute commands, emergency notifications, road work information, real-time traffic data, current weather conditions, information regarding laws and regulations (e.g., speed limits, whether right turns on red lights are permitted or prohibited, where U-turns are permitted or prohibited, permitted direction of travel, etc.), news events, and/or the like.

The user input 169 can also be a request to access a network (e.g., the network 110). In response to such a request, the interior interface system 125 can generate an access request 168, which can be processed by the communication system 124 to configure the communications array 122 to transmit and/or receive data corresponding to a user's interaction with the interior interface system 125 and/or with a user device 102 in communication with the interior interface system 125 (e.g., a user device 102 connected to the interior interface system 125 via a wireless connection). For example, the vehicle 120 can include on-board Wi-Fi, which the passenger(s) and/or driver can access to send and/or receive emails and/or text messages, stream audio and/or video content, browse content pages (e.g., network pages, web pages, etc.), and/or access applications that use network access. Based on user interactions, the interior interface system 125 can receive content 167 via the network 110, the communications array 122, and/or the communication system 124. The communication system 124 can dynamically manage network access to avoid or minimize disruption of the transmission of the content 167.

The sensor array 121 can include any number of one or more types of sensors, such as a satellite-radio navigation system (e.g., GPS), a LiDAR sensor, a landscape sensor (e.g., a radar sensor), an IMU, a camera (e.g., an infrared camera, a visible light camera, stereo cameras, etc.), a Wi-Fi detection system, a cellular communication system, an inter-vehicle communication system, a road sensor communication system, feature sensors, proximity sensors (e.g., infrared, electromagnetic, photoelectric, etc.), distance sensors, depth sensors, and/or the like. The satellite-radio navigation system may compute the current position (e.g., within a range of 1-10 meters) of the vehicle 120 based on an analysis of signals received from a constellation of satellites.

The LiDAR sensor, the radar sensor, and/or any other similar types of sensors can be used to detect the vehicle 120 surroundings while the vehicle 120 is in motion or about to begin motion. For example, the LiDAR sensor may be used to bounce multiple laser beams off approaching objects to assess their distance and to provide accurate 3D information on the surrounding environment. The data obtained from the LiDAR sensor may be used in performing object identification, motion vector determination, collision prediction, and/or in implementing accident avoidance processes. Optionally, the LiDAR sensor may provide a 360° view using a rotating, scanning mirror assembly. The LiDAR sensor may optionally be mounted on a roof of the vehicle 120.

The IMU may include X, Y, Z oriented gyroscopes and/or accelerometers. The IMU provides data on the rotational and linear motion of the vehicle 120, which may be used to calculate the motion and position of the vehicle 120.

Cameras may be used to capture visual images of the environment surrounding the vehicle 120. Depending on the configuration and number of cameras, the cameras may provide a 360° view around the vehicle 120. The images from the cameras may be used to read road markings (e.g., lane markings), read street signs, detect objects, and/or the like.

The Wi-Fi detection system and/or the cellular communication system may be used to perform triangulation with respect to Wi-Fi hot spots or cell towers respectively, to determine the position of the vehicle 120 (optionally in conjunction with then satellite-radio navigation system).

The inter-vehicle communication system (which may include the Wi-Fi detection system, the cellular communication system, and/or the communications array 122) may be used to receive and/or transmit data to the other vehicles 170A-N, such as current speed and/or location coordinates of the vehicle 120, time and/or location coordinates corresponding to when deceleration is planned and the planned rate of deceleration, time and/or location coordinates when a stop operation is planned, time and/or location coordinates when a lane change is planned and direction of lane change, time and/or location coordinates when a turn operation is planned, time and/or location coordinates when a parking operation is planned, and/or the like.

The road sensor communication system (which may include the Wi-Fi detection system and/or the cellular communication system) may be used to read information from road sensors (e.g., indicating the traffic speed and/or traffic congestion) and/or traffic control devices (e.g., traffic signals).

When a user requests transportation (e.g., via the application running on the user device 102), the user may specify a specific destination location. The origination location may be the current location of the vehicle 120, which may be determined using the satellite-radio navigation system installed in the vehicle (e.g., GPS, Galileo, BeiDou/COMPASS, DORIS, GLONASS, and/or other satellite-radio navigation system), a Wi-Fi positioning System, cell tower triangulation, and/or the like. Optionally, the origination location may be specified by the user via a user interface provided by the vehicle 120 (e.g., the interior interface system 125) or via the user device 102 running the application. Optionally, the origination location may be automatically determined from location information obtained from the user device 102. In addition to the origination location and destination location, one or more waypoints may be specified, enabling multiple destination locations.

Raw sensor data 161 from the sensor array 121 can be processed by the on-board data processing system 123. The processed data 162 can then be sent by the data processing system 123 to the vehicle control system 126, and optionally sent to the server 130 via the communication system 124 and the communications array 122.

The data store 129 can store map data (e.g., the map data 154) and/or a subset of the map data 154 (e.g., a portion of the map data 154 corresponding to a general region in which the vehicle 120 is currently located). The vehicle 120 can use the sensor array 121 to record updated map data along traveled routes, and transmit the updated map data to the server 130 via the communication system 124 and the communications array 122. The server 130 can then transmit the updated map data to one or more of the vehicles 170A-N and/or further process the updated map data.

The data processing system 123 can provide continuous or near continuous processed data 162 to the vehicle control system 126 to respond to point-to-point activity in the surroundings of the vehicle 120. The processed data 162 can comprise comparisons between the raw sensor data 161—which represents an operational environment of the vehicle 120, and which is continuously collected by the sensor array 121—and the map data stored in the data store 129. In an example, the data processing system 123 is programmed with machine learning or other artificial intelligence capabilities to enable the vehicle 120 to identify and respond to conditions, events, and/or potential hazards. In variations, the data processing system 123 can continuously or nearly continuously compare raw sensor data 161 to stored map data in order to perform a localization to continuously or nearly continuously determine a location and/or orientation of the vehicle 120. Localization of the vehicle 120 may allow the vehicle 120 to become aware of an instant location and/or orientation of the vehicle 120 in comparison to the stored map data in order to maneuver the vehicle 120 on surface streets through traffic and/or assist a driver in maneuvering the vehicle 120 on surface streets through traffic and identify and respond to potential hazards (e.g., pedestrians) or local conditions, such as weather or traffic conditions.

Furthermore, localization can enable the vehicle 120 to tune or beam steer the communications array 122 to maximize a communication link quality and/or to minimize interference with other communications from other vehicles 170A-N. For example, the communication system 124 can beam steer a radiation patterns of the communications array 122 in response to network configuration commands received from the server 130. The data store 129 may store current network resource map data that identifies network base stations and/or other network sources that provide network connectivity. The network resource map data may indicate locations of base stations and/or available network types (e.g., 3G, 4G, LTE, Wi-Fi, etc.) within a region in which the vehicle 120 is located.

While FIG. 1B describes certain operations as being performed by the vehicle 120 or the server 130, this is not meant to be limiting. The operations performed by the vehicle 120 and the server 130 as described herein can be performed by either entity. For example, certain operations normally performed by the server 130 (e.g., transmitting updating map data to the vehicles 170A-N) may be performed by the vehicle 120 for load balancing purposes (e.g., to reduce the processing load of the server 130, to take advantage of spare processing capacity on the vehicle 120, etc.).

Furthermore, any of the vehicles 170A-N may include some or all of the components of the vehicle 120 described herein. For example, a vehicle 170A-N can include a communications array 122 to communicate with the vehicle 120 and/or the server 130.

Machine Learning-Based Guest Rider Identification

In addition to the functionality performed by the server 130 as described above, the server 130 may also host a ride-share platform that allows ride requesters to request ride-share rides, that identifies drivers for requested rides, that establishes routes for the drivers to follow during requested rides, and/or that allows ride requesters and drivers to communicate with each other before the ride begins (e.g., before a passenger is picked up by the driver), during the ride, and/or after the ride ends.

As described above, communications between ride requesters and drivers may include chat messages and/or telephone conversations. While a ride requester may not explicitly inform the ride-share platform hosted by the server 130 that a ride is being requested on behalf of a guest rider, such communications may indicate this fact. Thus, the server 130 may include components that are configured to identify situations in which a ride requester is requesting a ride-share ride on behalf of a guest rider and, if such a situation is identified, cause appropriate guest rider action(s) to be executed.

Figure 2:
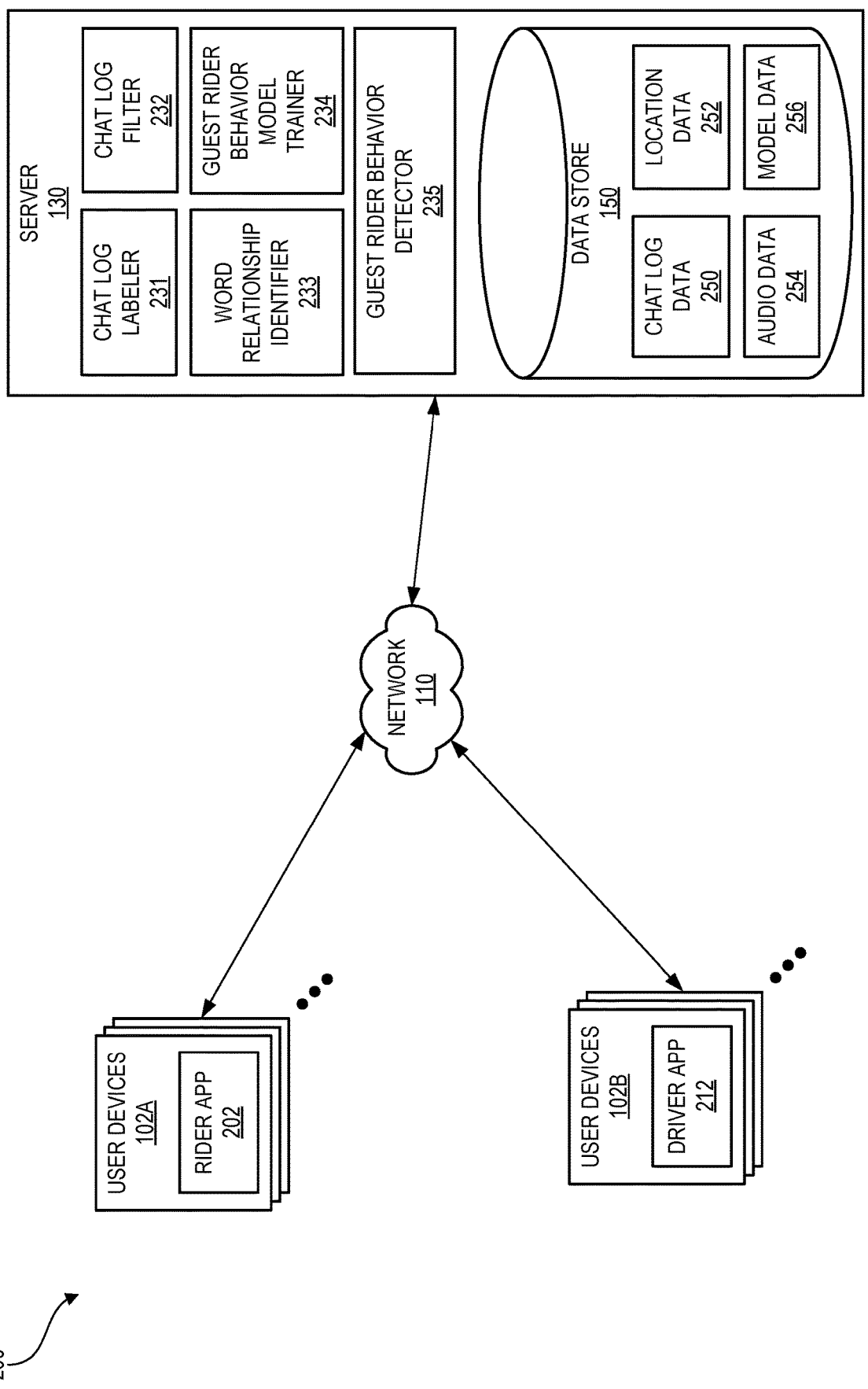
FIG. 2 illustrates a block diagram of a ride-share platform environment in which one or more user devices interact with the server via the network, according to certain aspects of the present disclosure.

FIG. 2 illustrates a block diagram of a ride-share platform environment 200 in which one or more user devices 102 interact with the server 130 via the network 110, according to certain aspects of the present disclosure. As illustrated in FIG. 2, the ride-share platform environment 200 may include one or more user devices 102A and one or more user devices 102B. The user device(s) 102A may each execute a rider app 202 and be operated by individuals that can request a ride-share ride via the rider app 202. The user device(s) 102B may each execute a driver app 212 and be operated by drivers that can be assigned and/or can accept requested rides via the driver app 212.

In addition, a ride requester can use the rider app 202 and a driver can use the driver app 212 to communicate with each other (e.g., chat messages, telephone calls, etc.). For example, when executed by a user device 102A, the rider app 202 can display a chat window or other similar interface that allows a ride requester to read, draft, and/or send chat messages. Similarly, when executed by a user device 102B, the driver app 212 can display a chat window or other similar interface that allows a driver to read, draft, and/or send chat messages. While not shown in FIG. 2, the server 130 can be configured to assign a driver to a ride requester that has requested a ride-share ride via the rider app 202. Once assigned, a ride requester (via the rider app 202) or the driver (via the driver app 212) can open a chat window and draft and send a chat message. The server 130 may receive the chat message from the transmitting app 202 or 212 via the network 110. The server 130 can store the chat message (e.g., in the data store 150 as chat log data 250) and/or forward the chat message to the rider app 202 of the ride requester assigned to the driver (e.g., if the chat message originates from the driver app 212) or to the driver app 212 of the driver assigned to the ride requester (e.g., if the chat message originates from the rider app 202) via the network 110. Thus, the server 130 may serve as an intermediary between a rider app 202 and a driver app 212 and facilitate communication between the two apps 202 and 212.

As used herein, a chat log may include some or all of the chat messages communicated during a ride-share session between a particular ride requester and a driver assigned to the ride requester (e.g., where the ride-share session may begin once a ride-share ride is requested and a driver is assigned and may end when the ride ends or a threshold period of time after the ride ends). The server 130 can store the chat messages corresponding to the same ride-share session together as a chat log in the data store 150, represented by the chat log data 250 in FIG. 2. Thus, the data store 150 can store a plurality of chat logs, where each chat log includes one or more chat messages and corresponds to a different ride-share session. Each chat message may include or otherwise be associated with metadata, such as metadata identifying the sender of the chat message (e.g., a ride requester, a driver, etc.), a time that the chat message was sent, a time that the chat message was received, an indication of whether the chat message was sent or received before a passenger is picked up, during the ride-share, or after a passenger is dropped off, a geographic location of the user device 102 from which the chat message was sent at a time that the chat message was sent, a geographic location of the user device 102 that received a chat message at a time that the chat message was received, and/or the like. The chat log data 250 may include chat messages and corresponding metadata. Alternatively or in addition, location data 252 stored in the data store 150 may include the metadata corresponding to the geographic location from which a user device 102 transmitted a chat message, the geographic location from which a user device 102 received a chat message, and/or generally the geographic locations of a user device 102A and a user device 102B during some or all of a ride-share session.

The server 130 may include various components that allow the server 130 to identify guest rider behavior (e.g., behavior in which a ride requester has requested a ride on behalf of a guest rider, such as a third party individual that is not an owner of the account from which the ride is requested). For example, the server 130 may include a chat log labeler 231, a chat log filter 232, a word relationship identifier 233, a guest rider behavior model trainer 234, and a guest rider behavior detector 235. The chat log labeler 231, the chat log filter 232, the word relationship identifier 233, and the guest rider behavior model trainer 234 may be used during a training phase to train an artificial intelligence model (e.g., a machine learning model) to detect or predict guest rider behavior. The chat log filter 232, the word relationship identifier 233, and the guest rider behavior detector 235 may be used during a real-time guest rider behavior detection phase to detect whether a requested ride is for a guest rider. As used herein, detecting guest rider behavior in "real-time" may include detecting guest rider behavior within a few seconds of when one or more chat messages are sent by an app 202 or 212, within a few seconds of when one or more chat messages sent by an app 202 or 212 are received by the server 130, and/or the like with little or no perceptible delay to an end user of the app 202 or 212.

The chat log labeler 231 can be configured to positively and/or negatively label chat messages that may be used to train an artificial intelligence model to detect or predict guest rider behavior. For example, a positive label applied to a chat message may indicate that the chat log labeler 231 has determined that the chat message indicates guest rider behavior. Similarly, a negative label applied to a chat message may indicate that the chat log labeler 231 has determined that the chat message does not indicate guest rider behavior. The chat log labeler 231 can apply labels to chat messages prior to an artificial intelligence model being trained to detect or predict guest rider behavior and/or prior to a trained artificial intelligence model being re-trained or updated to detect or predict guest rider behavior. In some embodiments, the chat log labeler 231 can apply labels to chat messages asynchronously from the server 130 receiving and storing chat messages and/or processing chat messages to identify potential guest rider behavior.

The chat log labeler 231 can obtain chat log data 250 and/or location data 252 from the data store 150 to perform the labeling. For example, the chat log data 250 may include historical chat logs corresponding to ride-share sessions that completed some time in the past. The location data 252 may include geographic locations (e.g., global positioning system (GPS) coordinates, such as latitude and/or longitude coordinates) from which user devices 102 transmitted chat messages. The chat log labeler 231 can parse through some or all of the chat messages included in the historical chat logs and, for each chat message, determine whether the respective chat message includes one or more predefined keywords and/or phrases (e.g., "guest," "proxy," "wife," "husband," "daughter," "son," "mother," "father," "grandmother," "grandfather," "elder," "friend," "minor," "underage," "for someone else," "not for me," "on behalf of," "I will not be joining," etc.) and/or whether the geographic location of the user device 102 from which the respective chat message was sent was at least a threshold distance (e.g., 100 m, 1 km, 2 km, 1000 ft, 0.5 miles, 1 mile, etc.) from the geographic location of the user device 102 that was the intended recipient of the chat message when the respective chat message was sent (which may indicate that the ride requester is not in the same geographic location as the driver and therefore the driver is picking up one or more guests instead, and where the distance between the two user devices 102 at the time the respective chat message was sent can be determined by the chat log labeler 231 using the chat message metadata and/or the location data 252). If the chat log labeler 231 determines that a respective chat message includes one or more predefined keywords or phrases or was sent from a user device 102 that is at least a threshold distance away from the user device 102 that received the respective chat message when the respective chat message was sent, then the chat log labeler 231 may apply a positive label to the respective chat message. Otherwise, if the chat log labeler 231 determines that a respective chat message does not include one or more predefined keywords or phrases and was not sent from a user device 102 that is at least a threshold distance away from the user device 102 that received the respective chat message when the respective chat message was sent, then the chat log labeler 231 may not apply any label to the respective chat message or may apply a negative label to the respective chat message.

Before, during, and/or after the chat log labeler 231 processes the historical chat logs and applies (or does not apply) labels to the chat messages included therein, the chat log filter 232 can be configured to filter the chat messages included in the historical chat logs to reduce the number of chat messages that will be included in the training data. For example, the chat log filter 232 can use the chat message metadata to identify which chat messages were generated and sent by a ride requester via a rider app 202. The chat log filter 232 can then discard those chat messages that were not generated and sent by a ride requester via a rider app 202 (e.g., discard those chat messages generated and sent by a driver via a driver app 212). Once discarded, the chat log filter 232 can then use the chat message metadata to identify which of the remaining chat messages were generated and sent prior to the passenger(s) being picked up. The chat log filter 232 can then discard those remaining chat messages that were not generated and sent prior to the passenger(s) being picked up (e.g., discard those remaining chat messages generated and sent after the passenger(s) were picked up). Thus, the chat log filter 232 can filter the chat messages to identify and keep those chat messages sent by a ride requester via a rider app 202 prior to the passenger(s) being picked up.

The word relationship identifier 233 can be configured to identify the relationship between words in one or more chat messages and create a data structure representing these relationships. For example, the word relationship identifier 233 can obtain the chat messages that remain after the chat log filter 232 performs the filtering described above. The word relationship identifier 233 can then apply a natural language processing algorithm to the remaining chat messages to generate one or more numerical vectors in which the vector(s) collectively, numerically represent the words in one or more chat messages and the relationships between the words in the one or more chat messages (e.g., between the words in a single chat message, between the words in consecutively sent chat messages, between the words in non-consecutively sent chat messages (e.g., between words in first chat message and in a second chat message where a third chat message was sent after the first chat message and before the second chat message), etc.). In particular, by applying the natural language processing algorithm, the word relationship identifier 233 may generate, for some or all of the words in one or more of the remaining chat messages, a vector in which the element(s) of the vector numerically represent the respective word. The vector generated for a particular word may be positioned in a vector space based on the elements of the vector. Thus, the word relationship identifier 233 may generate one or more vectors, where words that are more closely related based on the linguistic context of the words in the chat message(s) (e.g., as determined by the natural language processing algorithm when applied to the chat message(s)) may have their corresponding vectors located closer together in the vector space.

The vectors and/or the position of the vectors in the vector space may then indicate a frequency of words and/or a frequency or probability of words appearing together. In the context of how the vectors are used herein to train an artificial intelligence model to detect or predict guest rider behavior (as discussed below), the vectors and/or the position of the vectors in the vector space may indicate a frequency of words appearing in and/or a frequency or probability of words appearing together in chat messages, such as in chat messages that indicate guest rider behavior and/or chat messages that do not indicate guest rider behavior. In other words, the word relationship identifier 233 can apply the natural language processing algorithm to the remaining chat messages to learn the sentence structure of chat messages that may indicate guest rider behavior and/or that may not indicate guest rider behavior.

As an illustrative example, the word relationship identifier 233 can apply the word2vec algorithm to the remaining chat messages, which may use a trained neural network to construct a relationship between the words in the chat messages to which the algorithm is applied (e.g., construct a linguistic context or relationship of the words in the chat messages, such as a likelihood that one or more words may follow another word in a sentence or a sequence of sentences) represented by one or more numerical vectors. As another illustrative example, the word relationship identifier 223 can apply a bag-of-words algorithm to the remaining chat messages to generate the vector(s).

Once the vector(s) are generated, the word relationship identifier 233 can associate each vector with a positive or negative label applied by the chat log labeler 231 to the chat message from which the word associated with the respective vector originates, if applicable. Thus, the word relationship identifier 233 may produce one or more vectors, where each vector is labeled with a positive label or a negative or is not labeled at all (e.g., if the chat log labeler 231 did not apply any label to the chat message from which the word associated with the vector originates).

In further embodiments, the word relationship identifier 233 can process the chat message(s) prior to converting the chat message(s) into one or more vectors. For example, the word relationship identifier 233 may standardize the format of the chat message(s), such as by removing punctuation and/or white spaces, removing certain common words as indicated by a stored dictionary (e.g., articles or conjunctions, such as "a," "the," "and," etc.), removing accents or other markings that modify letters, and/or the like. The word relationship identifier 233 can then generate the vector(s) using the processed chat message(s).

The guest rider behavior model trainer 234 may be configured to train an artificial intelligence model to detect or predict guest rider behavior using the labeled and/or unlabeled vectors as the training data. For example, the guest rider behavior model trainer 234 can be configured to train a machine learning model using training data that includes the labeled and/or unlabeled vectors. In some embodiments, the training data can further include other information available via the chat log data 250, such as an indication of how many words appeared in one or more chat messages from which the vector(s) are derived, how many sentences (or chat messages) appeared in a chat log that includes one or more chat messages from which the vector(s) are derived, a time of day that one or more chat messages from which the vector(s) are derived were sent, a day of week that one or more chat messages from which the vector(s) are derived were sent, a day, week, or month of year that one or more chat messages from which the vector(s) are derived were sent, and/or the like. This other information, if included in the training data, may also be labeled (or not labeled) by the chat log labeler 231 in a manner as described herein prior to being used by the guest rider behavior model trainer 234 to perform the training. For example, the chat log labeler 231 can apply a positive label to the other information if a positive label is also applied to the chat message corresponding to the other information, can apply a negative label to the other information if a negative label is also applied to the chat message corresponding to the other information, or can apply no label to the other information if no label is applied to the chat message corresponding to the other information. The guest rider behavior model trainer 234 can store the trained artificial intelligence model in the data store 150, represented by model data 256.

The guest rider behavior model trainer 234 can train one artificial intelligence model to be applied to all chat messages that are received during a ride-share session. Alternatively, the guest rider behavior model trainer 234 can train multiple artificial intelligence models that are each associated with a particular driver, ride requester, group of drivers, group of ride requesters, geographic region from which a ride originates, geographic region at which a ride completes, geographic region that is traversed during a ride, time of day during which a ride is requested, time of year during which a ride is requested, and/or another similar type of criteria that may differentiate the characteristics of one ride-share session from another ride-share session. If training multiple artificial intelligence models, the guest rider behavior model trainer 234 may train the respective artificial intelligence model using a subset of the chat log data 250 that is associated with the same criteria as the artificial intelligence model being trained. As an illustrative example, if the guest rider behavior model trainer 234 is training an artificial intelligence model that is specific to a geographic region from which a ride originates, the guest rider behavior model trainer 234 may train the model using training data that includes labeled and/or unlabeled vectors derived from chat messages sent during ride-share sessions in which the ride originated in that same geographic region. The guest rider behavior model trainer 234 can store any number of trained artificial intelligence models in the data store 150, which may be collectively represented by the model data 256.

In further embodiments, the guest rider behavior model trainer 234 can retrain or update an existing, trained artificial intelligence model. For example, new training data may become available after the artificial intelligence model was initially trained, it may be determined that one or more chat messages from which the vector(s) were derived were incorrectly labeled by the chat log labeler 231, and/or the like. As a result, the chat log labeler 231 may label (or not label) the new training data, the chat log labeler 231 may re-label one or more chat messages identified as being incorrectly labeled, and/or one or more chat messages may be re-labeled manually, the word relationship identifier 233 can generate one or more vectors using the labeled, unlabeled, and/or newly labeled chat messages, and the guest rider behavior model trainer 234 can retrieve a trained artificial intelligence model from the data store 150 and retrain or update the retrieved artificial intelligence model using the newly generated vector(s) and/or some or all of the previously generated vector(s) initially used to train the artificial intelligence model. The guest rider behavior model trainer 234 can then store the retrained or updates artificial intelligence model in the data store 150.

The server 130 can begin detecting potential guest rider behavior in response to at least one artificial intelligence model being trained. For example, the server 130 may notify the chat log filter 232 when a new chat message is received from a rider app 202 or a driver app 212 and stored in the data store 150, with an indication of a ride-share session from which the chat message originates. After a new chat message associated with a particular ride-share session is received or after multiple chat messages associated with a particular ride-share session are received, the chat log filter 232 can retrieve the new chat message(s) and/or the chat message(s) previously sent during the same ride-share session from the data store 150. The chat log filter 232 can then perform the same filtering operations as described above, filtering these chat message(s) such that the chat message(s) that remain are those chat message(s) that were sent by a ride requester via a rider app 202 and before a passenger was picked up. In some embodiments, the server 130 may stop notifying the chat log filter 232 when a new chat message is received from a rider app 202 or a driver app 212 in association with a particular ride-share session the server 130 has been notified that a passenger has already been picked up (given that the chat log filter 232 may filter out these chat messages anyway).

The word relationship identifier 233 can apply a natural language processing algorithm to the new chat message(s) and/or the chat message(s) previously sent during the same ride-share session to generate one or more numerical vectors in a manner as described above. For example, the word relationship identifier 233 can apply the word2vec algorithm to the new chat message(s) and/or the chat message(s) previously sent during the same ride-share session to generate the vector(s).

The guest rider behavior detector 235 can retrieve an artificial intelligence model from the data store 150 and apply the generated vector(s) as an input to the retrieved artificial intelligence model. For example, if the data store 150 stores multiple artificial intelligence models, the guest rider behavior detector 235 can retrieve an artificial intelligence model from the data store 150 that is associated with the same criteria as the ride-share session from which the chat message(s) used to generated the vector(s) originate. As an illustrative example, if the ride-share session from which the chat message(s) used to generate the vector(s) originate occurs during a specific time of day, then the guest rider behavior detector 235 can retrieve from the data store 150 an artificial intelligence model that is associated with the specific time of day (e.g., trained to detect or predict guest rider behavior based on chat message(s) sent or received during the specific time of day). As another example, if the data store 150 stores a single artificial intelligence model that is applicable to all types of ride-share sessions, then the guest rider behavior detector 235 can retrieve this artificial intelligence model from the data store 150.

In response to applying the generated vector(s) as an input to the retrieved artificial intelligence model, the retrieved artificial intelligence model may output an indication of whether guest rider behavior is predicted or detected. As an illustrative example, the artificial intelligence model may output a numerical value between 0 and 1, where a value closer to 0 may indicate that guest rider behavior is likely not predicted or detected and where a value closer to 1 may indicate that guest rider behavior is likely predicted or detected. The guest rider behavior detector 235 may determine that the chat message(s) used to generate the artificial intelligence model output indicate guest rider behavior if the artificial intelligence model output is greater than a threshold value (e.g., 0.5).

If the guest rider behavior detector 235 determines that the chat message(s) used to generate the artificial intelligence model output indicate guest rider behavior, then the guest rider behavior detector 235 may cause one or more guest rider actions to occur. For example, the guest rider behavior detector 235 can cause another component of the server 130 (not shown) or another computing system (not shown) to assign or re-assign another driver to the requested ride (e.g., a female driver, a male driver, a driver with a higher rating, a driver that has passed an enhanced background check, etc.) given that chat message(s) sent before one or more passengers are picked up may be used to produce the guest rider behavior determination, and therefore the guest rider behavior detector 235 may detect the guest rider behavior before the passenger(s) are picked up. As another example, the guest rider behavior detector 235 can cause another component of the server 130 (not shown) or another computing system (not shown) to alter the ride route so that the vehicle 120 travels along busier streets or highways, well-lighted streets or highways, closer to law enforcement postings or locations, and/or the like. As another example, the guest rider behavior detector 235 can cause another component of the server 130 (not shown) or another computing system (not shown) to initiate fraud detection protocols, such as contacting a holder of the account that requested the ride to ensure that the account was not hacked or otherwise accessed without authorization by the account holder, canceling the requested ride (e.g., if the account holder indicates that a ride should not have been requested and/or should not have been requested for the passenger to be picked up), notifying the relevant authorities (e.g., if the account holder indicates that a ride should not have been requested and/or should not have been requested for the passenger to be picked up), blocking use of the account holder's credit card (e.g., if the account holder indicates that a ride should not have been requested and/or should not have been requested for the passenger to be picked up), and/or the like.

If the guest rider behavior detector 235 determines that the chat message(s) used to generate the artificial intelligence model output indicate no guest rider behavior, then the guest rider behavior detector 235 may not take any immediate action. Rather, the guest rider identification process may be repeated (e.g., the chat log filter 232 may access and filter newly obtained chat message(s) and/or previously received chat message(s), the word relationship identifier 233 may use the remaining chat message(s) to generate one or more vectors, and the guest rider behavior detector 235 may apply the vector(s) as an input to an artificial intelligence model), either until the guest rider behavior detector 235 identifies guest rider behavior, the passenger is picked up (which may be indicated by a driver via the driver app 212 and communicated to the server 130), and/or a threshold time has passed since chat message(s) were sent between the ride requester and the driver. Thus, during a particular ride-share session, the guest rider behavior detector 235 may attempt to detect guest rider behavior multiple times, such as each time one or more chat messages are sent between the ride requester and driver. As described above, the newly sent chat message(s) and previously sent chat messages sent during the same ride-share session may be processed collectively by the server 130 to detect potential guest rider behavior. Thus, as time passes and each time the guest rider behavior detector 235 performs a new prediction, the respective prediction may be based on a larger number of chat messages sent between the ride requester and the driver during the ride-share session than the previous prediction. As a result, a more recent prediction may be more accurate than a less recent prediction given that the artificial intelligence model may receive more input data from which to detect possible guest rider behavior in producing the more recent prediction.

In further embodiments, the server 130 can detect possible guest rider behavior based on captured audio data, such as audio data 254 that may be stored in the data store 150. The server 130 can detect possible guest rider behavior based on captured audio data alone or based on a combination of captured audio data and chat messages. For example, instead of or in addition to sending chat messages, the ride requester and driver may communicate with each other via a telephone call (which may be facilitated via the rider app 202 and the driver app 212). In some cases, such as if agreed to by the rider requester and/or driver, the rider app 202 and/or driver app 212 can record the telephone call and transmit the recording to the server 130 via the network 110. The server 130 can store the telephone call recording in the data store 150, represented as the audio data 254.

The server 130 may receive audio for one or more telephone calls recorded during one or more ride-share sessions, and the server 130 can eventually use the audio to train the artificial intelligence model. For example, the server 130 can perform speech recognition on the recorded telephone call(s) to generate a transcript or similar file that includes text of the utterances made by the ride requester and/or driver during the recorded telephone call(s). In some cases, as part of the speech recognition process, the server 130 may annotate the transcript or otherwise indicate in the transcript whether a sentence in the transcript was uttered by a first person (e.g., a ride requester) or a second person (e.g., a driver). The chat log labeler 231 can then use the transcript in a manner similar to as described above with respect to chat message(s) to apply (or not apply) labels to individual sentences within the transcript. The chat log filter 232, the word relationship identifier 233, and the guest rider behavior model trainer 234 can then perform the same operations as described above to train an artificial intelligence model. In other words, the server 130 may first convert the recorded telephone call(s) into text. Once converted, the transcript may be in the same format as chat messages, and so the server 130 may perform the same operations as described above to train the artificial intelligence model using the text instead of chat message(s).

Similarly, when attempting to detect guest rider behavior during a current ride-share session, the server 130 may periodically receive recorded telephone calls between a ride requester and a driver. When the server 130 receives a recorded telephone call, the server 130 can store the recorded telephone call in the data store 150 as audio data 254 and/or can perform speech recognition on the recorded telephone call and store the resulting transcript in the data store 150. When the server 130 receives a recorded telephone call, the server 130 can also perform speech recognition on the recorded telephone call to produce a transcript, and provide the transcript to the chat log filter 232. The chat log filter 232 may further obtain from the data store 150 previously recorded telephone call(s) that occurred during the same ride-share session as the just-received telephone call recording, if present, and perform speech recognition on the previously recorded telephone call(s) to generate one or more additional transcripts. Alternatively, speech recognition may have already been performed by the server 130 on the previously recorded telephone call(s), and so the chat log filter 232 may simply obtain from the data store 150 the previously generated transcript(s). As described above, the generated transcript(s) may be in the same format as chat messages (e.g., include text associated with one speaker, text associated with another speaker, etc.). Thus, the chat log filter 232 can filter the transcript(s) to include those sentences uttered by a ride requester before a passenger is picked up. The word relationship identifier 233 and the guest rider behavior detector 235 can then perform the same operations as described above to detect or predict guest rider behavior, using the filtered transcript(s) rather than filtered chat message(s). In other words, the server 130 may first convert the received, recorded telephone call into text, convert previously-received telephone calls into text, and/or obtain text previously generated from previously-received telephone calls. Once converted and/or obtain, the server 130 may perform the same operations as described above to detect or predict guest rider behavior using the text instead of chat message(s).

Figure 3:
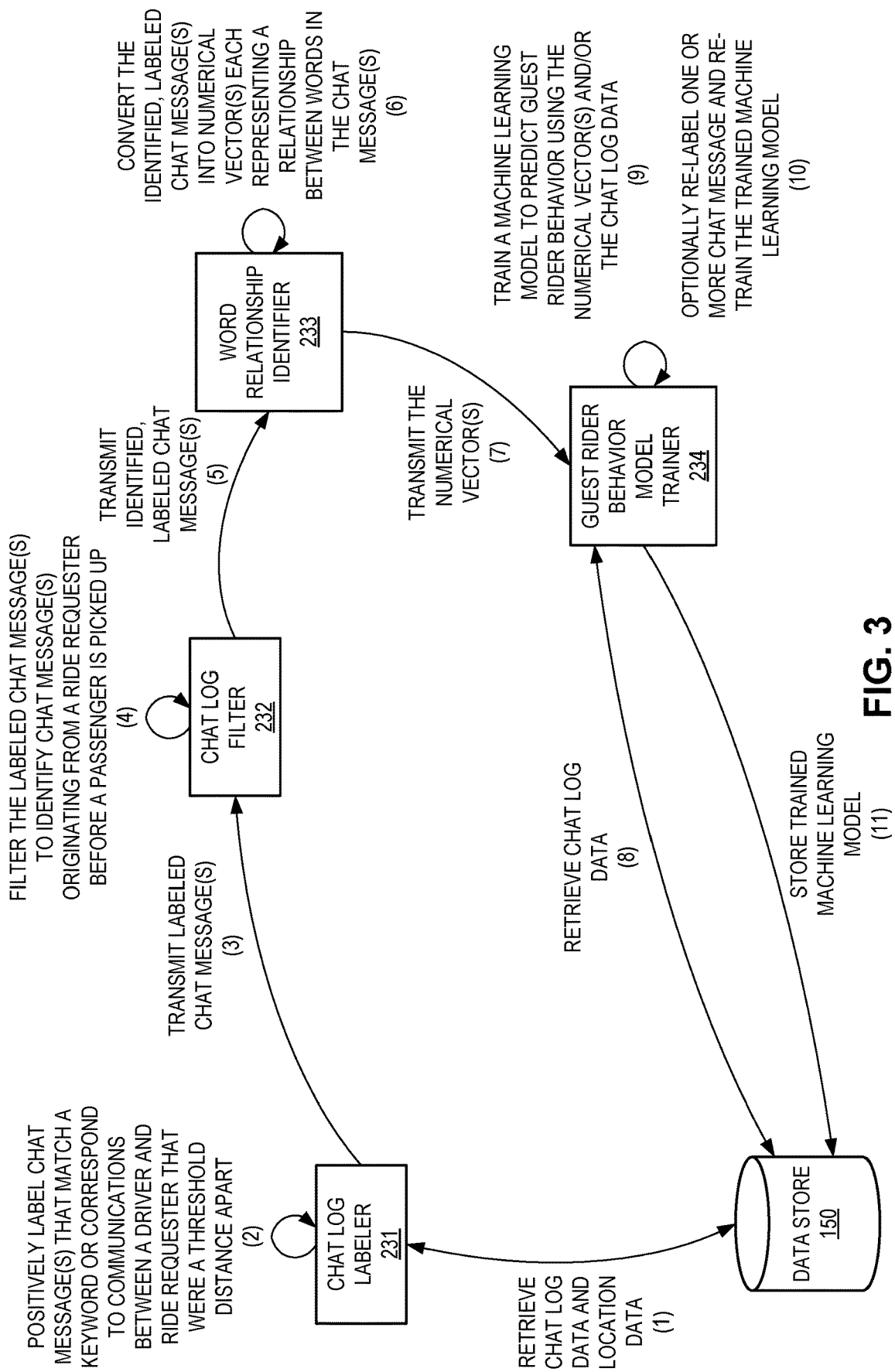
FIG. 3 illustrates a block diagram showing the operations performed by the server to train a machine learning model to predict guest rider behavior, according to one embodiment.

FIG. 3 illustrates a block diagram showing the operations performed by the server 130 to train a machine learning model to predict guest rider behavior, according to one embodiment. As illustrated in FIG. 3, the chat log labeler 231 can retrieve chat log data and location data from the data store 150 at (1). The chat log data and/or location data may correspond to all types of ride-share sessions that occurred in the past (e.g., ride-share sessions that correspond to any criterion) and/or to a specific type of ride-share session that occurred in the past (e.g., ride-share sessions that correspond to a particular criterion).

The chat log labeler 231 can positively label at (2) chat messages that match a keyword or that correspond to communications between a driver and a ride requester that were a threshold distance apart when the communications were sent. For example, the chat log labeler 231 can obtain the location data to determine the location at which a ride requester (e.g., the user device 102A) was located when a chat message was sent by the ride requester to a driver, the location at which a driver (e.g., the user device 102B) was located when a chat message was received by the driver, the location at which a ride requester (e.g., the user device 102A) was located when a chat message was sent by the driver to the ride requester, and/or the location at which a driver (e.g., the user device 102B) was located when a chat message was sent by the driver to the ride requester. Thus, the chat log labeler 231 can determine, for each chat message, a distance between a sender of the chat message and a recipient of the chat message by comparing the location of the sender and the location of the recipient at the time the respective chat message was sent. The chat log labeler 231 can then compare the determined location to the threshold to determine whether to apply a positive label to the respective chat message. In some embodiments, the chat log labeler 231 can apply a negative label to a chat message if the chat message does not include a keyword and was sent while the ride requester and driver were within a threshold distance of each other. In other embodiments, the chat log labeler 231 does not apply any label to a chat message if the chat message does not include a keyword and was sent while the ride requester and driver were within a threshold distance of each other. The chat log labeler 231 can transmit the labeled (and/or unlabeled) chat message(s) to the chat log filter 232 at (3).

The chat log filter 232 can filter the labeled (and/or unlabeled) chat message(s) to identify chat message(s) originating from a ride requester before a passenger is picked up at (4). The chat log filter 232 can then transmit the identified, labeled (and/or unlabeled) chat message(s) to the word relationship identifier 233 at (5). In some embodiments, the chat log filter 232 can obtain the chat log data from the data store 150 and perform the filter operations before, during, and/or after the chat log labeler 231 applies labels to some or all of the chat messages. In such a situation, the chat log filter 232 can send the filtered chat message(s) to the word relationship identifier 233 and the chat log labeler 231 can separately transmit an indication of labels that were applied to chat messages to the word relationship identifier 233.

The word relationship identifier 233 can convert the identified, labeled (and/or unlabeled) chat message(s) into one or more numerical vector(s) that each represent a relationship between words in the chat message(s) at (6). For example, the word relationship identifier 233 can perform the conversion by applying a natural language processing algorithm to the identified, labeled (and/or unlabeled) chat message(s). After performing the conversion, the word relationship identifier 233 can transmit the vector(s) to the guest rider behavior model trainer 234 at (7).

The guest rider behavior model trainer 234 can retrieve chat log data from the data store 150 at (8). For example, the chat log data can include the geographic location from which a user device 102 transmitted a chat message, the geographic location from which a user device 102 received a chat message, and/or generally the geographic locations of a user device 102A and a user device 102B during some or all of a ride-share session. The guest rider behavior model trainer 234 can then train a machine learning model to predict guest rider behavior using the vector(s) and/or the chat log data at (9). Optionally, the guest rider behavior model trainer 234 can re-label one or more chat message(s) (or cause the chat log labeler 231 to re-label one or more chat message(s)) and re-train the trained machine learning model at (10) using vector(s) derived from the re-labeled chat message(s) and/or originally labeled chat message(s). For example, a chat message may be re-labeled if a determination is made manually or by the server 130 in response to subsequent data received by the server 130 from a user device 102A or a user device 102B that the chat log labeler 231 incorrectly labeled the chat message (e.g., guest rider behavior is not present when a positive label was applied or guest rider behavior is present with a negative label or no label was applied). The guest rider behavior model trainer 234 can then store the trained (or re-trained) machine learning model in the data store 150 at (11).

Figure 4:
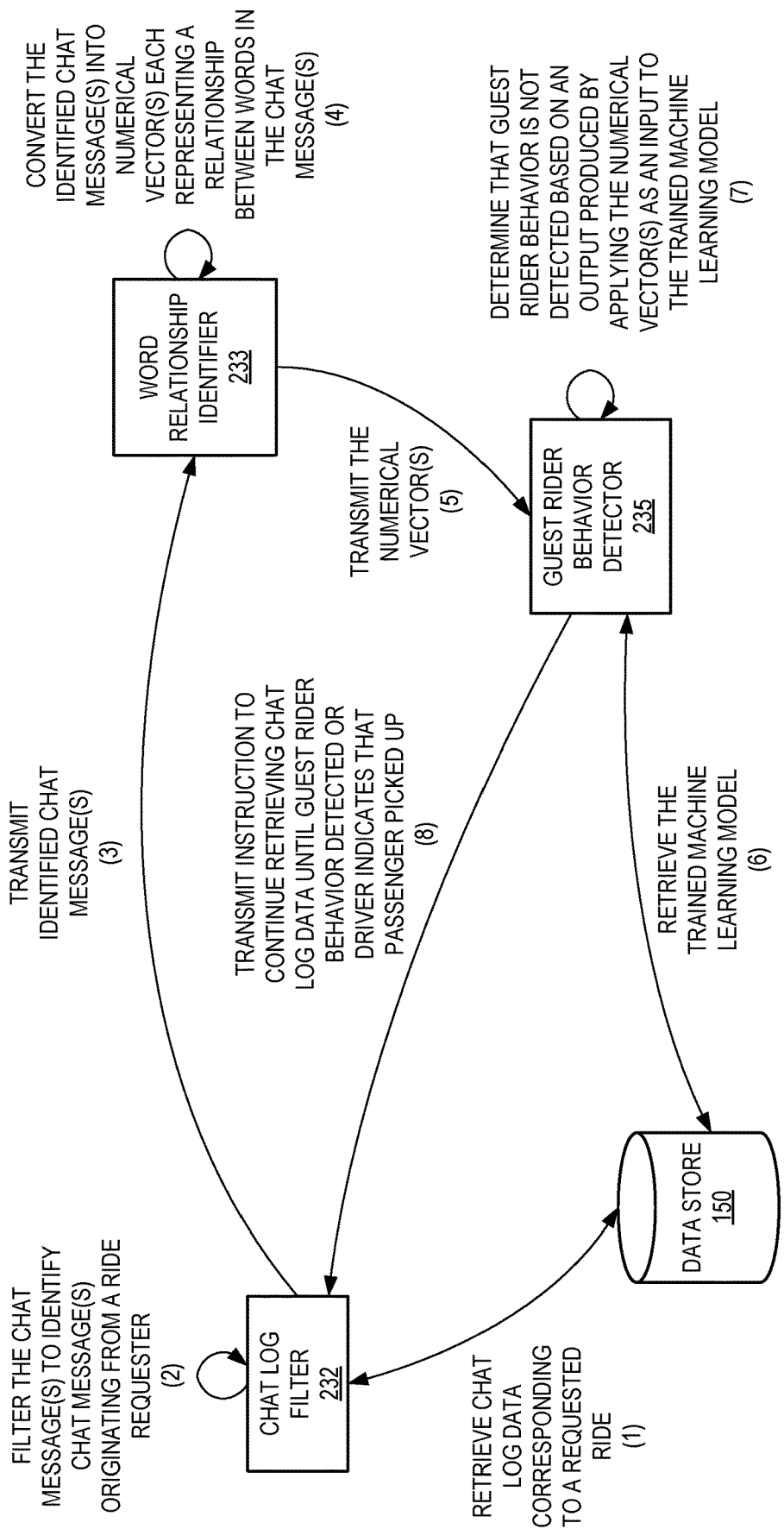
FIG. 4 illustrates a block diagram showing the operations performed by the server to determine, in real-time, that no guest rider behavior is detected, according to one embodiment.

FIG. 4 illustrates a block diagram showing the operations performed by the server 130 to determine, in real-time, that no guest rider behavior is detected, according to one embodiment. As illustrated in FIG. 4, the chat log filter 232 retrieves chat log data corresponding to a requested ride from the data store at (1). For example, the chat log filter 232 may retrieve a most-recently received chat message sent during a particular ride-share session and/or one or more previously-recited chat messages previously sent during the same ride-share session.

The chat log filter 232 can then filter the chat message(s) to identify chat message(s) originating from a ride requester at (2). Optionally, the chat log filter 232 can filter the chat message(s) to identify chat message(s) originating from the ride requester and sent prior to a passenger being picked up. The chat log filter 232 can then transmit the identified chat message(s) to the word relationship identifier 233 at (3).

The word relationship identifier 233 can convert the identified chat message(s) into one or more numerical vector(s) that each represent a relationship between words in the chat message(s) at (4). For example, the word relationship identifier 233 can perform the conversion by applying a natural language processing algorithm to the identified chat message(s). After performing the conversion, the word relationship identifier 233 can transmit the vector(s) to the guest rider behavior detector 235 at (5).

The guest rider behavior detector 235 can retrieve a trained machine learning model from the data store 150 at (6). For example, the guest rider behavior detector 235 can retrieve a trained machine learning model that is associated with a criterion that matches a criterion associated with the ride-share session from which the chat message(s) used to derive the vector(s) originate. The guest rider behavior detector 235 can determine that guest rider behavior is not detected based on an output produced by applying the numerical vector(s) as an input to the trained machine learning model at (7). For example, the trained machine learning model may output a value that is less than a threshold value (e.g., 0.5) when provided with the vector(s) as an input.

In response to the determination that no guest rider behavior is detected, the guest rider behavior detector 235 can transmit an instruction to the chat log filter 232 at (8) to continue retrieving chat log data (e.g., when new chat message(s) are received by the server 130) until guest rider behavior is detected by the guest rider behavior detector 235 or until a drives indicates that a passenger has been picked up. Thus, some or all of the operations described herein with respect to FIG. 4 may be repeated one or more times for the same ride-share session.

Figure 5:
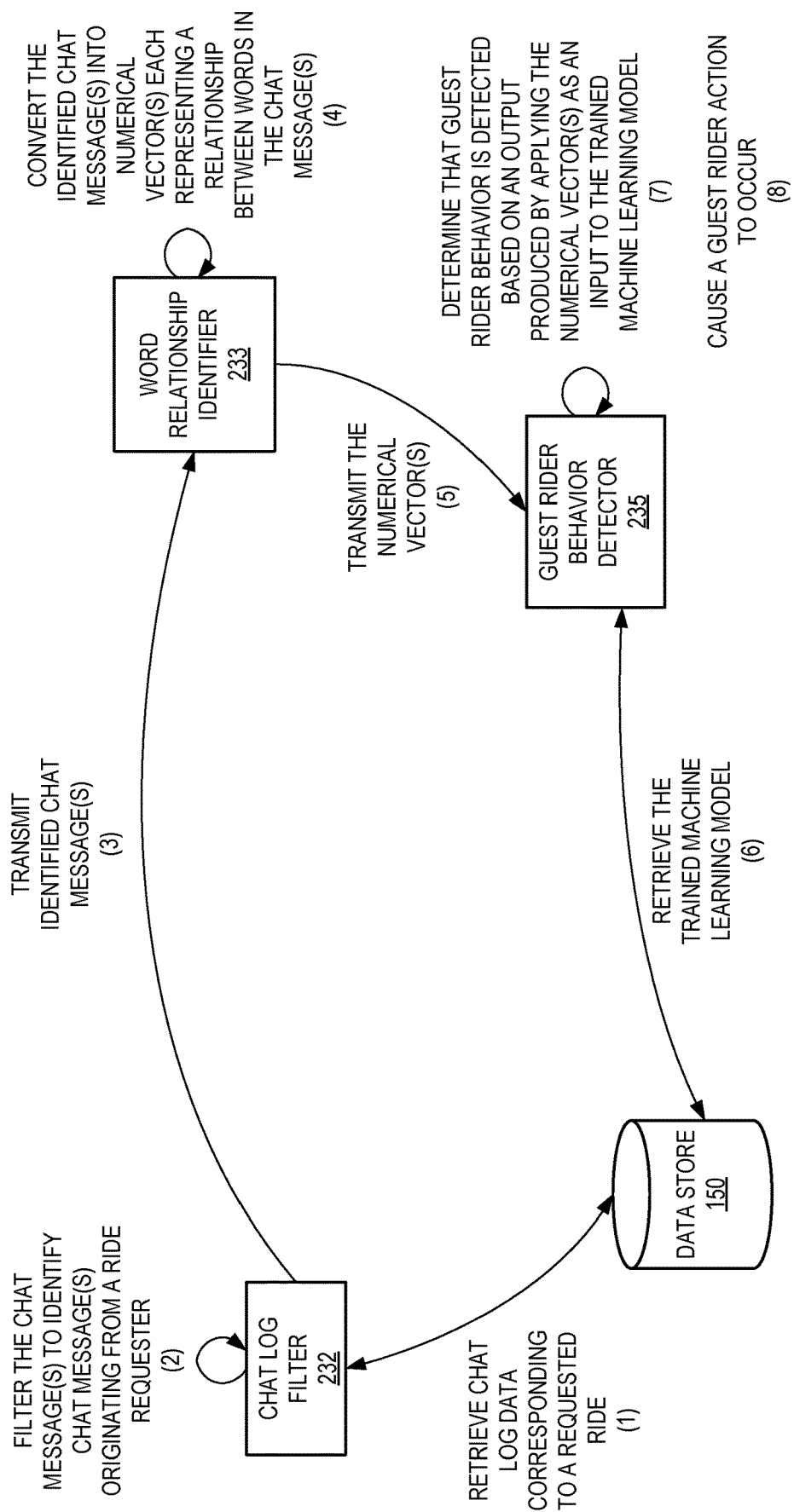
FIG. 5 illustrates a block diagram showing the operations performed by the server to determine, in real-time, that guest rider behavior is detected, according to one embodiment.

FIG. 5 illustrates a block diagram showing the operations performed by the server 130 to determine, in real-time, that guest rider behavior is detected, according to one embodiment. As illustrated in FIG. 5, the chat log filter 232 retrieves chat log data corresponding to a requested ride from the data store at (1). For example, the chat log filter 232 may retrieve a most-recently received chat message sent during a particular ride-share session and/or one or more previously-recited chat messages previously sent during the same ride-share session.

The chat log filter 232 can then filter the chat message(s) to identify chat message(s) originating from a ride requester at (2). Optionally, the chat log filter 232 can filter the chat message(s) to identify chat message(s) originating from the ride requester and sent prior to a passenger being picked up. The chat log filter 232 can then transmit the identified chat message(s) to the word relationship identifier 233 at (3).

The word relationship identifier 233 can convert the identified chat message(s) into one or more numerical vector(s) that each represent a relationship between words in the chat message(s) at (4). For example, the word relationship identifier 233 can perform the conversion by applying a natural language processing algorithm to the identified chat message(s). After performing the conversion, the word relationship identifier 233 can transmit the vector(s) to the guest rider behavior detector 235 at (5).

The guest rider behavior detector 235 can retrieve a trained machine learning model from the data store 150 at (6). For example, the guest rider behavior detector 235 can retrieve a trained machine learning model that is associated with a criterion that matches a criterion associated with the ride-share session from which the chat message(s) used to derive the vector(s) originate. The guest rider behavior detector 235 can determine that guest rider behavior is detected based on an output produced by applying the numerical vector(s) as an input to the trained machine learning model at (7). For example, the trained machine learning model may output a value that is less than a threshold value (e.g., 0.5) when provided with the vector(s) as an input.

In response to the determination that guest rider behavior is detected, the guest rider behavior detector 235 can cause a guest rider action to occur at (8). For example, the guest rider behavior detector 235 can cause another component of the server 130 (not shown) or another computing system (not shown) to assign or re-assign another driver to the requested ride (e.g., a female driver, a male driver, a driver with a higher rating, a driver that has passed an enhanced background check, etc.) given that chat message(s) sent before one or more passengers are picked up may be used to produce the guest rider behavior determination, and therefore the guest rider behavior detector 235 may detect the guest rider behavior before the passenger(s) are picked up. As another example, the guest rider behavior detector 235 can cause another component of the server 130 (not shown) or another computing system (not shown) to alter the ride route so that the vehicle 120 travels along busier streets or highways, well-lighted streets or highways, closer to law enforcement postings or locations, and/or the like. As another example, the guest rider behavior detector 235 can cause another component of the server 130 (not shown) or another computing system (not shown) to initiate fraud detection protocols, such as contacting a holder of the account that requested the ride to ensure that the account was not hacked or otherwise accessed without authorization by the account holder, canceling the requested ride (e.g., if the account holder indicates that a ride should not have been requested and/or should not have been requested for the passenger to be picked up), notifying the relevant authorities (e.g., if the account holder indicates that a ride should not have been requested and/or should not have been requested for the passenger to be picked up), blocking use of the account holder's credit card (e.g., if the account holder indicates that a ride should not have been requested and/or should not have been requested for the passenger to be picked up), and/or the like.

Figure 6:
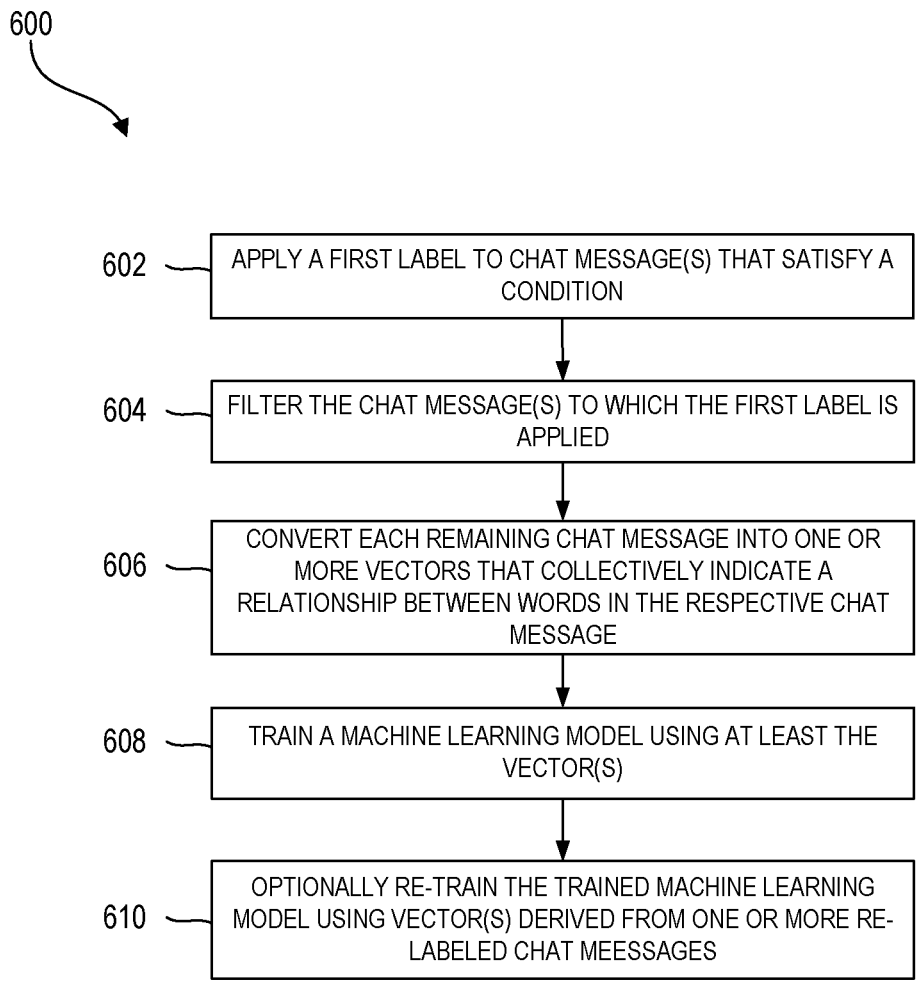
FIG. 6 shows a flow diagram illustrative of embodiments of a routine implemented by the server to train a machine learning model to predict or detect guest rider behavior.

FIG. 6 shows a flow diagram illustrative of embodiments of a routine 600 implemented by the server 130 to train a machine learning model to predict or detect guest rider behavior. The elements outlined for routine 600 may be implemented by one or more components of the server 130, such as the chat log labeler 231, the chat log filter 232, the word relationship identifier 233, and the guest rider behavior model trainer 234.

At block 602, a first label is applied to chat message(s) that satisfy a condition. For example, the condition may be satisfied if a chat message includes one of a set of keywords. As another example, the condition may be satisfied if a chat message corresponds to communications between a driver and a ride requester that occurred when the driver and ride requester were a threshold distance apart.

At block 604, the chat message(s) to which the first label is applied are filtered. For example, the chat message(s) to which the first label is applied may be filtered such that the remaining chat message(s) are those that were sent by a ride requester and before a passenger was picked up by the driver.

At block 606, each remaining chat message is converted into one or more vectors that collectively indicate a relationship between words in the respective chat message. For example, a remaining chat message can be converted into the vector(s) by applying a natural language processing algorithm to the remaining chat message.

At block 608, a machine learning model is trained using at least the vector(s). For example, the machine learning model can be further trained using chat log data, such as the geographic location from which a user device 102 transmitted a chat message, the geographic location from which a user device 102 received a chat message, and/or generally the geographic locations of a user device 102A and a user device 102B during some or all of a ride-share session.

At block 610, the trained machine learning model is optionally re-trained using vector(s) derived from one or more re-labeled chat messages. For example, a manual or automatic (e.g., as performed by the server 130 based on subsequent data received after a ride-share session ends indicating whether the ride was for the ride requester or a guest rider, where such subsequent data may be provided by a driver via the driver app 212) review of the labeled (and/or unlabeled) chat message(s) may indicate that at least some of the chat message(s) may have been labeled incorrectly. As a result, server 130 can apply correct labels (or remove labels from) the chat message(s) and the machine learning model can be re-trained or updated using vector(s) derived from the correctly labeled (and/or unlabeled) chat message(s) and/or derived from previously labeled (and/or unlabeled) chat messages that were previously correctly labeled or unlabeled. After the trained machine learning model is optionally re-trained, the routine 600 may end.

Fewer, more, or different blocks can be used as part of the routine 600. In some cases, one or more blocks can be omitted. Furthermore, it will be understood that the various blocks described herein with reference to FIG. 6 can be implemented in a variety of orders, or can be performed concurrently.

Figure 7:
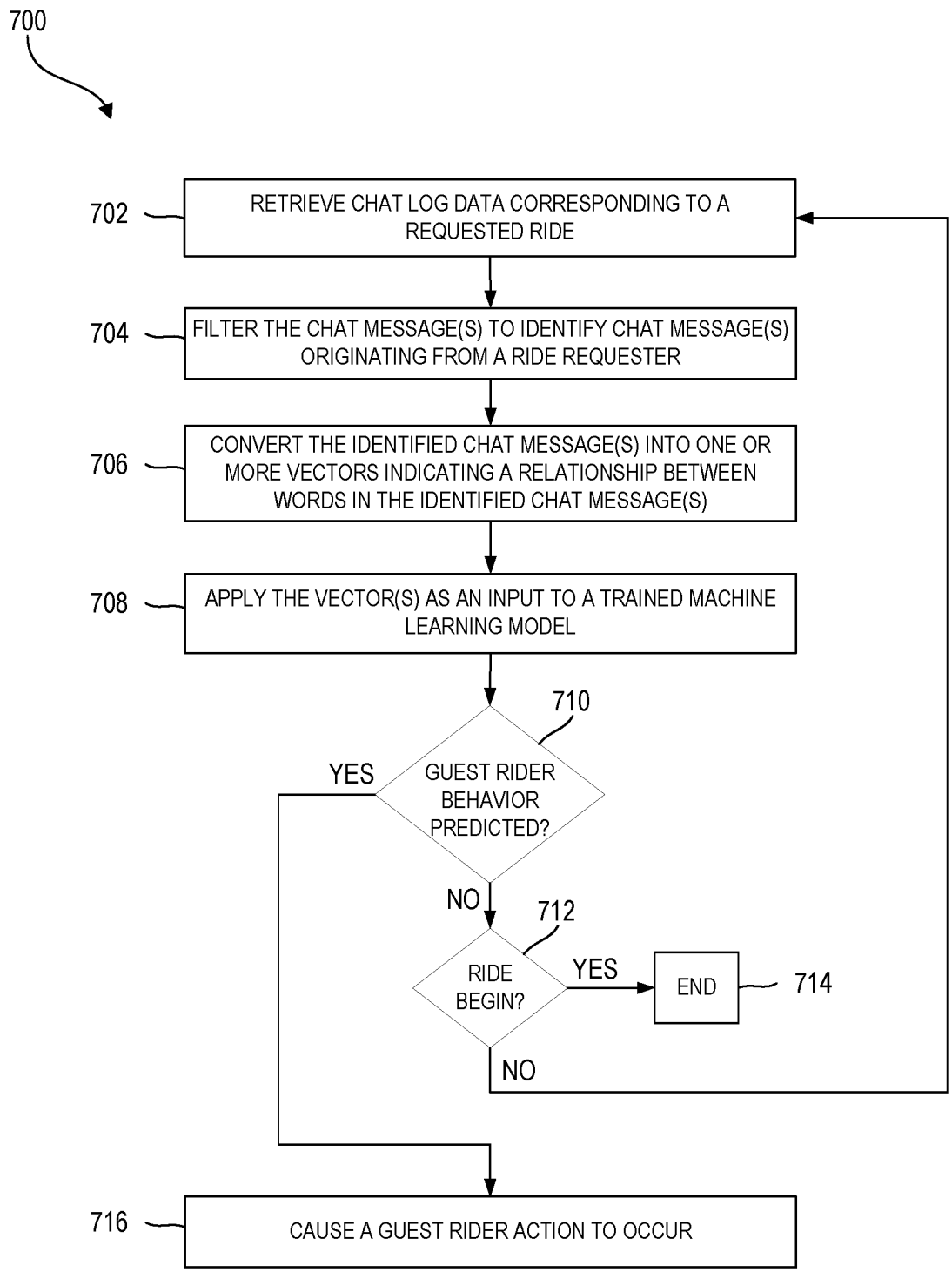
FIG. 7 shows a flow diagram illustrative of embodiments of a routine implemented by the server to detect guest rider behavior.

FIG. 7 shows a flow diagram illustrative of embodiments of a routine 700 implemented by the server 130 to detect guest rider behavior. The elements outlined for routine 700 may be implemented by one or more components of the server 130, such as the chat log filter 232, the word relationship identifier 233, and the guest rider behavior detector 235.

At block 702, chat log data corresponding to a requested ride is retrieved. For example, the chat log data may include chat message(s) sent during a particular ride-share session.

At block 704, the chat message(s) are filtered to identify chat message(s) originating from a ride requester. The chat message(s) can be further filtered such that the remaining chat message(s) are those that were sent by a ride requester and before a passenger was picked up by the driver.

At block 706, the identified chat message(s) are converted into one or more vectors that collectively indicate a relationship between words in the identified chat message(s). For example, an identified chat message can be converted into the vector(s) by applying a natural language processing algorithm to the identified chat message.

At block 708, the vector(s) are applied as an input to a trained machine learning model. For example, the trained machine learning model may be a generally applicable machine learning model that applies to different types of ride-share sessions. As another example, the trained machine learning model may be specifically applicable to a particular type of ride-share session, such as a ride-share session that occurs at a particular time of day, that is initiated by a ride requester having a certain demographic or gender, that originates at a particular geographic location, that ends at a particular geographic location, and/or the like. Applying the vector(s) as an input to the trained machine learning model may cause the trained machine learning model to produce an output that can be used to determine whether guest rider behavior is predicted.

At block 710, a determination is made as to whether guest rider behavior is predicted. For example, guest rider behavior may be predicted if the trained machine learning model outputs a value greater than a threshold value (e.g., 0.5). If a determination is made that guest rider behavior is predicted, then the routine 700 proceeds to block 716. Otherwise, if a determination is made that guest rider behavior is not predicted, then the routine 700 proceeds to block 712.

At block 712, a determination is made as to whether a ride has begun. For example, a ride may begin when at least one passenger is picked up by a driver. The server 130 may be informed that a passenger has been picked up by a driver via the driver app 212. If a determination is made that the ride has begun, then the routine 700 proceeds to block 714 and ends. Otherwise, if a determination is made that the ride has not yet begun, then the routine 700 reverts back to block 702 and repeats blocks 702, 704, 706, 708, 710, 712, 714, and/or 716. In other words, the routine 700 may repeat, with the vector(s) being applied as an input to the trained machine learning model being derived from previously received and stored chat message(s) and/or newly received chat message(s) (e.g., chat message(s) received within a few seconds of a time that the preprocessing occurs and/or before the chat message(s) are forwarded by the server 130 to an intended recipient user device 102).

At block 716, a guest rider action is caused to occur. For example, the guest rider action may include assigning or re-assigning another driver to the requested ride (e.g., a female driver, a male driver, a driver with a higher rating, a driver that has passed an enhanced background check, etc.) given that chat message(s) sent before one or more passengers are picked up may be used to produce the guest rider behavior determination, and therefore the guest rider behavior detector 235 may detect the guest rider behavior before the passenger(s) are picked up. As another example, the guest rider action may include altering the ride route so that the vehicle 120 travels along busier streets or highways, well-lighted streets or highways, closer to law enforcement postings or locations, and/or the like. As another example, the guest rider action may include initiating fraud detection protocols, such as contacting a holder of the account that requested the ride to ensure that the account was not hacked or otherwise accessed without authorization by the account holder, canceling the requested ride (e.g., if the account holder indicates that a ride should not have been requested and/or should not have been requested for the passenger to be picked up), notifying the relevant authorities (e.g., if the account holder indicates that a ride should not have been requested and/or should not have been requested for the passenger to be picked up), blocking use of the account holder's credit card (e.g., if the account holder indicates that a ride should not have been requested and/or should not have been requested for the passenger to be picked up), and/or the like. After the guest rider action is caused to occur, the routine 700 ends.

Fewer, more, or different blocks can be used as part of the routine 700. In some cases, one or more blocks can be omitted. Furthermore, it will be understood that the various blocks described herein with reference to FIG. 7 can be implemented in a variety of orders, or can be performed concurrently.

In regard to the figures described herein, other embodiments are possible, such that the above-recited components, steps, blocks, operations, and/or messages/requests/queries/ instructions are differently arranged, sequenced, sub-divided, organized, and/or combined. In some embodiments, a different component may initiate or execute a given operation. For example, a computing device separate from the server 130 and/or separate from a computing device that assigns drivers, manages ride routes, authenticate users, manages payments for rides, and/or the like can perform some or all of the functionality described herein to train an artificial intelligence model, to detect guest rider behavior, and/or to use a trained artificial intelligence model to detect potential guest rider behavior. In addition, the computing device that performs the labeling, filtering, vector generation, and/or training operations may be different than the computing device that performs the filtering, vector generation, and/or guest rider behavior detection operations.

Example Embodiments

Some example enumerated embodiments are recited in this section in the form of methods, systems, and non-transitory computer-readable media, without limitation.

One aspect of the disclosure provides a system comprising a data store comprising chat log data. The system further comprises a processor in communication with the data store, the processor configured with computer-executable instructions that, when executed, cause the processor to: obtain the chat log data, where the chat log data comprises a plurality of chat messages sent between a driver and a ride requester during a ride-share session; apply a first label to any chat message in the plurality of chat messages that satisfies a condition; filter the plurality of chat messages to exclude any chat message in the plurality of chat messages that was sent by the driver or that was sent after a passenger was picked up during the ride-share session; convert each chat message in the filtered plurality of chat messages into one or more vectors; apply the first label to a vector in the one or more vectors in response to a determination that the first label is applied to a chat message from which the respective vector is derived; and train, using the one or more vectors, an artificial intelligence model to predict behavior in which another ride requester has initiated another ride-share session on behalf of a third party.

The system of the preceding paragraph can include any sub-combination of the following features: where the computer-executable instructions, when executed, further cause the processor to convert each chat message in the filtered plurality of chat messages into the one or more vectors using a natural language processing algorithm; where the first label comprises a positive label; where the computer-executable instructions, when executed, further cause the processor to apply a negative label to any chat message in the plurality of chat messages that does not satisfy the condition; where the condition is satisfied if the respective chat message in the plurality of chat messages includes one or more keywords; where the data store further comprises location data, and where the location data comprises an indication of a geographic location of the driver and a geographic location of the ride requester when each chat message in the plurality of chat messages was sent; where the condition in response to a determination that the respective chat message in the plurality of chat messages was sent when a difference between a geographic location of the driver and a geographic location of the ride requester was at least a threshold distance; where the data store further comprises audio data, and where the audio data corresponds to one or more recorded telephone calls between the driver and the ride requester during the ride-share session; where the computer-executable instructions, when executed, further cause the processor to: obtain the audio data, perform speech recognition on the audio data to generate a transcript, apply the first label to any sentence in the transcript that satisfies the condition, filter the transcript to exclude any sentence uttered by the driver or that was uttered after the passenger was picked up during the ride-share session, convert each sentence in the filtered transcript into one or more second vectors, apply the first label to a vector in the one or more second vectors in response to a determination that the first label is applied to a sentence from which the respective vector is derived, and train, using the one or more vectors and the one or more second vectors, the artificial intelligence model; and where the artificial intelligence model comprises a machine learning model.

Another aspect of the disclosure provides a computer-implemented method comprising: as implemented by one or more computing devices that provide a ride-share platform, obtaining chat log data, where the chat log data comprises a plurality of chat messages sent between a driver and a ride requester during a ride-share session; applying a first label to any chat message in the plurality of chat messages that satisfies a condition; filtering the plurality of chat messages to exclude any chat message in the plurality of chat messages that was sent by the driver or that was sent after a passenger was picked up during the ride-share session; converting each chat message in the filtered plurality of chat messages into one or more vectors; applying the first label to a vector in the one or more vectors in response to a determination that the first label is applied to a chat message from which the respective vector is derived; and training, using the one or more vectors, an artificial intelligence model to predict behavior in which another ride requester has initiated another ride-share session on behalf of a third party.

The computer-implemented method of the preceding paragraph can include any sub-combination of the following features: where converting each chat message in the filtered plurality of chat messages into one or more vectors further comprises converting each chat message in the filtered plurality of chat messages into the one or more vectors using a natural language processing algorithm; where the first label comprises a positive label; where the computer-implemented method further comprises applying a negative label to any chat message in the plurality of chat messages that does not satisfy the condition; where the condition is satisfied if the respective chat message in the plurality of chat messages includes one or more keywords; and where the computer-implemented method further comprises: obtaining audio data, where the audio data corresponds to one or more recorded telephone calls between the driver and the ride requester during the ride-share session, performing speech recognition on the audio data to generate a transcript, applying the first label to any sentence in the transcript that satisfies the condition, filtering the transcript to exclude any sentence uttered by the driver or that was uttered after the passenger was picked up during the ride-share session, converting each sentence in the filtered transcript into one or more second vectors, applying the first label to a vector in the one or more second vectors in response to a determination that the first label is applied to a sentence from which the respective vector is derived, and training, using the one or more vectors and the one or more second vectors, the artificial intelligence model.

Another aspect of the disclosure provides non-transitory, computer-readable storage media comprising computer executable instructions for training an artificial intelligence model for predicting guest rider behavior, where the computer-executable instructions, when executed by a computing system, cause the computing system to: obtain chat log data, where the chat log data comprises a plurality of chat messages sent between a driver and a ride requester during a ride-share session; apply a first label to any chat message in the plurality of chat messages that satisfies a condition; filter the plurality of chat messages to exclude any chat message in the plurality of chat messages that was sent by the driver or that was sent after a passenger was picked up during the ride-share session; convert each chat message in the filtered plurality of chat messages into one or more vectors; apply the first label to a vector in the one or more vectors in response to a determination that the first label is applied to a chat message from which the respective vector is derived; and train, using the one or more vectors, the artificial intelligence model to predict behavior in which another ride requester has initiated another ride-share session on behalf of a third party.

The non-transitory, computer-readable storage media of the preceding paragraph can include any sub-combination of the following features: where the computer-executable instructions, when executed, further cause the computing system to convert each chat message in the filtered plurality of chat messages into the one or more vectors using a natural language processing algorithm; where the computer-executable instructions, when executed, further cause the computing system to apply a negative label to any chat message in the plurality of chat messages that does not satisfy the condition; and where the computer-executable instructions, when executed, further cause the computing system to: obtain audio data, where the audio data corresponds to one or more recorded telephone calls between the driver and the ride requester during the ride-share session, perform speech recognition on the audio data to generate a transcript, apply the first label to any sentence in the transcript that satisfies the condition, filter the transcript to exclude any sentence uttered by the driver or that was uttered after the passenger was picked up during the ride-share session, convert each sentence in the filtered transcript into one or more second vectors, apply the first label to a vector in the one or more second vectors in response to a determination that the first label is applied to a sentence from which the respective vector is derived, and train, using the one or more vectors and the one or more second vectors, the artificial intelligence model.

Another aspect of the disclosure provides a system comprising a data store comprising chat log data corresponding to a ride-share session. The system further comprises a processor in communication with the data store, the processor configured with computer-executable instructions that, when executed, cause the processor to: retrieve the chat log data corresponding to the ride-share session, where the chat log data comprises a plurality of chat messages sent between a driver and a ride requester during the ride-share session; filter the plurality of chat messages to exclude any chat message in the plurality of chat messages that was sent by the driver or that was sent after a passenger was picked up during the ride-share session; convert each chat message in the filtered plurality of chat messages into one or more vectors; apply the one or more vectors as an input to an artificial intelligence model trained to predict whether the ride requester has initiated the ride-share session on behalf of a third party; and cause a guest rider action to occur in response to a determination that the artificial intelligence model outputs a value that exceeds a threshold value.

The system of the preceding paragraph can include any sub-combination of the following features: where the computer-executable instructions, when executed, further cause the processor to retrieve the chat log data in response to a determination that a chat message associated with the ride-share session has been received; where the computer-executable instructions, when executed, further cause the processor to: determine whether a passenger has been picked up by the driver during the ride-share session in response to a determination that the value does not exceed the threshold value, and use the artificial intelligence model to predict whether the ride requester has initiated the ride-share session on behalf of the third party based on the one or more vectors and one or more second vectors derived from a new chat message received after the artificial intelligence model outputs the value in response to a determination that the passenger has not been picked up; where the computer-executable instructions, when executed, further cause the processor to continue using the artificial intelligence model to determine whether the ride requester has initiated the ride-share session on behalf of the third party until either the artificial intelligence model outputs a second value that exceeds the threshold value or an indication is received that the passenger was picked up; where the guest rider action comprises one of assignment or re-assignment of another driver to the ride-share session, alteration of a ride route for the ride-share session, or initiation of a fraud detection protocol; where the computer-executable instructions, when executed, further cause the processor to convert each chat message in the filtered plurality of chat messages into the one or more vectors using a natural language processing algorithm; where the data store further comprises audio data, and where the audio data corresponds to one or more recorded telephone calls between the driver and the ride requester during the ride-share session; where the computer-executable instructions, when executed, further cause the processor to: obtain the audio data, perform speech recognition on the audio data to generate a transcript, filter the transcript to exclude any sentence uttered by the driver or that was uttered after the passenger was picked up during the ride-share session, convert each sentence in the filtered transcript into one or more second vectors, and apply the one or more vectors and the one or more second vectors as an input to the artificial intelligence model trained to predict whether the ride requester has initiated the ride-share session on behalf of the third party; where the artificial intelligence model comprises a machine learning model; and where the artificial intelligence model is associated with a same criterion as the ride-share session.

Another aspect of the disclosure provides a computer-implemented method comprising: as implemented by one or more computing devices in communication, over a network, with a user device operated by a driver and a user device operated by a ride requester, retrieving chat log data corresponding to a ride-share session, where the chat log data comprises a plurality of chat messages sent between the user device operated by the driver and the user device operated by the ride requester during the ride-share session; filtering the plurality of chat messages to exclude any chat message in the plurality of chat messages that was sent by the driver or that was sent after a passenger was picked up during the ride-share session; converting each chat message in the filtered plurality of chat messages into one or more vectors; applying the one or more vectors as an input to an artificial intelligence model trained to predict whether the ride requester has initiated the ride-share session on behalf of a third party; and causing a guest rider action to occur in response to a determination that the artificial intelligence model outputs a value that exceeds a threshold value.

The computer-implemented method of the preceding paragraph can include any sub-combination of the following features: where retrieving chat log data further comprises retrieving the chat log data in response to a determination that a chat message associated with the ride-share session has been received; where the computer-implemented method further comprises: determining whether a passenger has been picked up by the driver during the ride-share session in response to a determination that the value does not exceed the threshold value, and using the artificial intelligence model to predict whether the ride requester has initiated the ride-share session on behalf of the third party based on the one or more vectors and one or more second vectors derived from a new chat message received after the artificial intelligence model outputs the value in response to a determination that the passenger has not been picked up; where the computer-implemented method further comprises continuing to use the artificial intelligence model to determine whether the ride requester has initiated the ride-share session on behalf of the third party until either the artificial intelligence model outputs a second value that exceeds the threshold value or an indication is received that the passenger was picked up; where the guest rider action comprises one of assignment or re-assignment of another driver to the ride-share session, alteration of a ride route for the ride-share session, or initiation of a fraud detection protocol; and where the computer-implemented method further comprises: obtaining audio data, where the audio data corresponds to one or more recorded telephone calls between the driver and the ride requester during the ride-share session, performing speech recognition on the audio data to generate a transcript, filtering the transcript to exclude any sentence uttered by the driver or that was uttered after the passenger was picked up during the ride-share session, converting each sentence in the filtered transcript into one or more second vectors, and applying the one or more vectors and the one or more second vectors as an input to the artificial intelligence model trained to predict whether the ride requester has initiated the ride-share session on behalf of the third party.

Another aspect of the disclosure provides non-transitory, computer-readable storage media comprising computer executable instructions for predicting guest rider behavior, where the computer-executable instructions, when executed by a computing system, cause the computing system to: retrieve chat log data corresponding to the ride-share session, where the chat log data comprises a plurality of chat messages sent between a driver and a ride requester during a ride-share session; filter the plurality of chat messages to exclude any chat message in the plurality of chat messages that was sent by the driver or that was sent after a passenger was picked up during the ride-share session; convert each chat message in the filtered plurality of chat messages into one or more vectors; apply the one or more vectors as an input to an artificial intelligence model trained to predict whether the ride requester has initiated the ride-share session on behalf of a third party; and cause a guest rider action to occur in response to a determination that the artificial intelligence model outputs a value that exceeds a threshold value.

The non-transitory, computer-readable storage media of the preceding paragraph can include any sub-combination of the following features: where the computer-executable instructions, when executed, further cause the computing system to: determine whether a passenger has been picked up by the driver during the ride-share session in response to a determination that the value does not exceed the threshold value, and use the artificial intelligence model to predict whether the ride requester has initiated the ride-share session on behalf of the third party based on the one or more vectors and one or more second vectors derived from a new chat message received after the artificial intelligence model outputs the value in response to a determination that the passenger has not been picked up; where the computer-executable instructions, when executed, further cause the computing system to continue using the artificial intelligence model to determine whether the ride requester has initiated the ride-share session on behalf of the third party until either the artificial intelligence model outputs a second value that exceeds the threshold value or an indication is received that the passenger was picked up; and where the computer-executable instructions, when executed, further cause the computing system to: obtain audio data, where the audio data corresponds to one or more recorded telephone calls between the driver and the ride requester during the ride-share session, perform speech recognition on the audio data to generate a transcript, filter the transcript to exclude any sentence uttered by the driver or that was uttered after the passenger was picked up during the ride-share session, convert each sentence in the filtered transcript into one or more second vectors, and apply the one or more vectors and the one or more second vectors as an input to the artificial intelligence model trained to predict whether the ride requester has initiated the ride-share session on behalf of the third party.

In other embodiments, a system or systems may operate according to one or more of the methods and/or computer-readable media recited in the preceding paragraphs. In yet other embodiments, a method or methods may operate according to one or more of the systems and/or computer-readable media recited in the preceding paragraphs. In yet more embodiments, a computer-readable medium or media, excluding transitory propagating signals, may cause one or more computing devices having one or more processors and non-transitory computer-readable memory to operate according to one or more of the systems and/or methods recited in the preceding paragraphs.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of one or more embodiments can be modified, if necessary, to employ the systems, functions, and concepts of the various references described above. These and other changes can be made in light of the above Detailed Description. While the above description describes certain examples, and describes the best mode contemplated, no matter how detailed the above appears in text, different embodiments can be practiced in many ways. Details of the system may vary considerably in its specific implementation. As noted above, particular terminology used when describing certain features should not be taken to imply that the terminology is being redefined herein to be restricted to any specific characteristics, features with which that terminology is associated. In general, the terms used in the following claims should not be construed to limit the scope the specific examples disclosed in the specification, unless the above Detailed Description section explicitly defines such terms. Accordingly, the actual scope encompasses not only the disclosed examples, but also all equivalent ways of practicing or implementing the claims.

To reduce the number of claims, certain aspects of the present disclosure are presented below in certain claim forms, but the applicant contemplates other aspects of the present disclosure in any number of claim forms. For example, while only one aspect of the present disclosure is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A system comprising:
a data store comprising chat log data corresponding to a ride-share session; and
a processor in communication with the data store, the processor configured with computer-executable instructions that, when executed, cause the processor to:
train an artificial intelligence model to predict behavior in which a ride requester has initiated a second ride-share session on behalf of a third party person using data representing a plurality of training chat messages, wherein each training chat message in the plurality is labeled based on at least one of a keyword present in the respective chat message or a geographic location from which the respective chat message was sent;
retrieve the chat log data corresponding to the ride-share session, wherein the chat log data comprises a plurality of chat messages sent between a driver and a second ride requester during the ride-share session;
filter the plurality of chat messages to exclude any chat message in the plurality of chat messages that was sent by the driver or that was sent after a passenger was picked up during the ride-share session;
convert each chat message in the filtered plurality of chat messages into one or more vectors;
apply the one or more vectors as an input to the trained artificial intelligence model to predict whether the second ride requester has initiated the ride-share session on behalf of a second third party person, wherein application of the one or more vectors as the input to the trained artificial intelligence model causes the trained artificial intelligence model to output a value that exceeds a threshold;
determine that the filtered plurality of chat messages indicates that the second ride requester has initiated the ride-share session on behalf of the second third party person based on the value exceeding the threshold; and
cause a guest rider action to occur in response to the determination that the plurality of chat messages indicates that the second ride requester has initiated the ride-share session on behalf of the second third party person.

2. The system of claim 1, wherein the computer-executable instructions, when executed, further cause the processor to retrieve the chat log data in response to a determination that a chat message associated with the ride-share session has been received.

3. The system of claim 1, wherein the computer-executable instructions, when executed, further cause the processor to:
determine whether a passenger has been picked up by the driver during the ride-share session in response to a determination that the value does not exceed the threshold value; and
use the trained artificial intelligence model to predict whether the second ride requester has initiated the ride-share session on behalf of the second third party person based on the one or more vectors and one or more second vectors derived from a new chat message received after the trained artificial intelligence model outputs the value in response to a determination that the passenger has not been picked up.

4. The system of claim 1, wherein the computer-executable instructions, when executed, further cause the processor to continue using the trained artificial intelligence model to determine whether the second ride requester has initiated the ride-share session on behalf of the second third party person until either the trained artificial intelligence model outputs a second value that exceeds the threshold value or an indication is received that the passenger was picked up.

5. The system of claim 1, wherein the guest rider action comprises one of assignment or re-assignment of another driver to the ride-share session, alteration of a ride route for the ride-share session, or initiation of a fraud detection protocol.

6. The system of claim 1, wherein the computer-executable instructions, when executed, further cause the processor to convert each chat message in the filtered plurality of chat messages into the one or more vectors using a natural language processing algorithm.

7. The system of claim 1, wherein the data store further comprises audio data, and wherein the audio data corresponds to one or more recorded telephone calls between the driver and the ride requester during the ride-share session.

8. The system of claim 7, wherein the computer-executable instructions, when executed, further cause the processor to:
   obtain the audio data;
   perform speech recognition on the audio data to generate a transcript;
   filter the transcript to exclude any sentence uttered by the driver or that was uttered after the passenger was picked up during the ride-share session;
   convert each sentence in the filtered transcript into one or more second vectors; and
   apply the one or more vectors and the one or more second vectors as an input to the trained artificial intelligence model.

9. The system of claim 1, wherein the trained artificial intelligence model comprises a machine learning model.

10. The system of claim 1, wherein the trained artificial intelligence model is associated with a same criterion as the ride-share session.

11. A computer-implemented method comprising:
   as implemented by one or more computing devices in communication, over a network, with a user device operated by a driver and a user device operated by a ride requester,
   training an artificial intelligence model to predict behavior in which a second ride requester has initiated a ride-share session on behalf of a third party person using data representing a plurality of training chat messages, wherein each training chat message in the plurality is labeled based on at least one of a keyword present in the respective chat message or a geographic location from which the respective chat message was sent;
   retrieving chat log data corresponding to a second ride-share session, wherein the chat log data comprises a plurality of chat messages sent between the user device operated by the driver and the user device operated by the ride requester during the second ride-share session;
   filtering the plurality of chat messages to exclude any chat message in the plurality of chat messages that was sent by the driver or that was sent after a passenger was picked up during the second ride-share session;
   converting each chat message in the filtered plurality of chat messages into one or more vectors;
   applying the one or more vectors as an input to the trained artificial intelligence model to predict whether the ride requester has initiated the second ride-share session on behalf of a second third party person, wherein application of the one or more vectors as the input to the trained artificial intelligence model causes the trained artificial intelligence model to output a value that exceeds a threshold;
   determining that the filtered plurality of chat messages indicates that the ride requester has initiated the second ride-share session on behalf of the second third party person based on the value exceeding the threshold; and
   causing a guest rider action to occur in response to the determination that the plurality of chat messages indicates that the ride requester has initiated the second ride-share session on behalf of the second third party person.

12. The computer-implemented method of claim 11, wherein retrieving chat log data further comprises retrieving the chat log data in response to a determination that a chat message associated with the second ride-share session has been received.

13. The computer-implemented method of claim 11, further comprising:
   determining whether a passenger has been picked up by the driver during the second ride-share session in response to a determination that the value does not exceed the threshold value; and
   using the trained artificial intelligence model to predict whether the ride requester has initiated the second ride-share session on behalf of the second third party person based on the one or more vectors and one or more second vectors derived from a new chat message received after the trained artificial intelligence model outputs the value in response to a determination that the passenger has not been picked up.

14. The computer-implemented method of claim 11, further comprising continuing to use the trained artificial intelligence model to determine whether the ride requester has initiated the second ride-share session on behalf of the second third party person until either the trained artificial intelligence model outputs a second value that exceeds the threshold value or an indication is received that the passenger was picked up.

15. The computer-implemented method of claim 11, wherein the guest rider action comprises one of assignment or re-assignment of another driver to the ride-share session, alteration of a ride route for the ride-share session, or initiation of a fraud detection protocol.

16. The computer-implemented method of claim 11, further comprising:
   obtaining audio data, wherein the audio data corresponds to one or more recorded telephone calls between the driver and the ride requester during the second ride-share session;
   performing speech recognition on the audio data to generate a transcript;
   filtering the transcript to exclude any sentence uttered by the driver or that was uttered after the passenger was picked up during the second ride-share session;
   converting each sentence in the filtered transcript into one or more second vectors; and
   applying the one or more vectors and the one or more second vectors as an input to the trained artificial intelligence model.

17. Non-transitory, computer-readable storage media comprising computer executable instructions for predicting guest rider behavior, wherein the computer-executable instructions, when executed by a computing system, cause the computing system to:
   train an artificial intelligence model to predict behavior in which a ride requester has initiated a ride-share session on behalf of a third party person using data representing a plurality of training chat messages, wherein each training chat message in the plurality is labeled based on at least one of a keyword present in the respective chat message or a geographic location from which the respective chat message was sent;

retrieve chat log data corresponding to a second ride-share session, wherein the chat log data comprises a plurality of chat messages sent between a driver and a second ride requester during the second ride-share session;
filter the plurality of chat messages to exclude any chat message in the plurality of chat messages that was sent by the driver or that was sent after a passenger was picked up during the second ride-share session;
convert each chat message in the filtered plurality of chat messages into one or more vectors;
apply the one or more vectors as an input to the trained artificial intelligence model trained to predict whether the second ride requester has initiated the second ride-share session on behalf of a second third party person, wherein application of the one or more vectors as the input to the trained artificial intelligence model causes the trained artificial intelligence model to output a value that exceeds a threshold;
determine that the filtered plurality of chat messages indicates that the second ride requester has initiated the second ride-share session on behalf of the second third party person based on the value exceeding the threshold; and
cause a guest rider action to occur in response to the determination that the plurality of chat messages indicates that the second ride requester has initiated the ride-share session on behalf of the second third party person.

18. The non-transitory, computer-readable storage media of claim 17, wherein the computer-executable instructions, when executed, further cause the computing system to:
determine whether a passenger has been picked up by the driver during the second ride-share session in response to a determination that the value does not exceed the threshold value; and
use the trained artificial intelligence model to predict whether the second ride requester has initiated the second ride-share session on behalf of the second third party person based on the one or more vectors and one or more second vectors derived from a new chat message received after the trained artificial intelligence model outputs the value in response to a determination that the passenger has not been picked up.

19. The non-transitory, computer-readable storage media of claim 17, wherein the computer-executable instructions, when executed, further cause the computing system to continue using the trained artificial intelligence model to determine whether the second ride requester has initiated the second ride-share session on behalf of the second third party person until either the trained artificial intelligence model outputs a second value that exceeds the threshold value or an indication is received that the passenger was picked up.

20. The non-transitory, computer-readable storage media of claim 17, wherein the computer-executable instructions, when executed, further cause the computing system to:
obtain audio data, wherein the audio data corresponds to one or more recorded telephone calls between the driver and the second ride requester during the second ride-share session;
perform speech recognition on the audio data to generate a transcript;
filter the transcript to exclude any sentence uttered by the driver or that was uttered after the passenger was picked up during the second ride-share session;
convert each sentence in the filtered transcript into one or more second vectors; and
apply the one or more vectors and the one or more second vectors as an input to the trained artificial intelligence model.

* * * * *